US 8,563,893 B2

(12) United States Patent
Kuno et al.

(10) Patent No.: US 8,563,893 B2
(45) Date of Patent: Oct. 22, 2013

(54) LASER MATERIAL PROCESSING SYSTEM

(75) Inventors: Koji Kuno, Hamamatsu (JP); Kenichi Muramatsu, Hamamatsu (JP); Kazuhiro Atsumi, Hamamatsu (JP); Tetsuya Osajima, Hamamatsu (JP)

(73) Assignee: Hamamatsu Photonics K.K., Hamamatsu-shi, Shizuoka (JP)

(*) Notice: Subject to any disclaimer, the term of this patent is extended or adjusted under 35 U.S.C. 154(b) by 1053 days.

(21) Appl. No.: 12/096,940

(22) PCT Filed: Dec. 12, 2006

(86) PCT No.: PCT/JP2006/324750
§ 371 (c)(1),
(2), (4) Date: Feb. 6, 2009

(87) PCT Pub. No.: WO2007/072709
PCT Pub. Date: Jun. 28, 2007

(65) Prior Publication Data
US 2009/0166342 A1 Jul. 2, 2009

(30) Foreign Application Priority Data
Dec. 22, 2005 (JP) ................. P2005-370608

(51) Int. Cl.
*H01L 21/78* (2006.01)
*H01S 3/13* (2006.01)
*B23K 26/00* (2006.01)
*B23K 26/06* (2006.01)

(52) U.S. Cl.
USPC .............. 219/121.62; 219/121.68; 250/492.2; 250/492.23; 372/20; 372/29.02; 438/463

(58) Field of Classification Search
USPC ............. 219/121.68, 121.69, 121.78, 121.83, 219/121.6, 121.19, 121.2, 121.25; 438/463; 372/20, 29.02–29.32; 250/492.2, 250/492.23
See application file for complete search history.

(56) References Cited

U.S. PATENT DOCUMENTS 5,124,522 A * 6/1992 Booke et al. ............. 219/121.19
5,656,186 A * 8/1997 Mourou et al. .......... 219/121.69

(Continued)

FOREIGN PATENT DOCUMENTS

CN 1720117 1/2006
EP 1 707 298 10/2006

(Continued)

OTHER PUBLICATIONS

K. Hayashi; "Inner Glass Marking by Harmonics of Solid-State Laser", Proceedings of $45^{th}$ Laser Materials Processing Conference, Dec. 1998, pp. 23-28.

(Continued)

*Primary Examiner* — Samuel M Heinrich
(74) *Attorney, Agent, or Firm* — Drinker Biddle & Reath LLP

(57) ABSTRACT

A laser processing apparatus comprises a converging lens 31 for converging processing laser light and rangefinding laser light L2 toward a wafer 1, an actuator for actuating the lens 31, a shaping optical system 49 for adding astigmatism to reflected light L3 of the rangefinding laser light, a quadrant photodiode 42 for receiving the reflected light L3 and outputting voltage values corresponding to its light quantities, and a controller for regulating the actuator, and positions a converging point P2 of the rangefinding laser light L2 between a focal point P0 of the lens and the lens 31, so as to make it possible to form a modified region at a position deeper from the front face 3, thereby suppressing adverse effects due to the reflected light L3. The control is based on an arithmetic value subjected to a division by a sum of the voltage values, so as to prevent the arithmetic value from being changed by the quantity of reflected light.

4 Claims, 22 Drawing Sheets

(56) References Cited

U.S. PATENT DOCUMENTS

| | | |
|---|---|---|
| 6,526,089 B1 * | 2/2003 | Haeno et al. ............ 372/101 |
| 6,777,645 B2 * | 8/2004 | Ehrmann et al. ........ 219/121.73 |
| 6,878,900 B2 * | 4/2005 | Corkum et al. ......... 219/121.69 |
| 6,992,026 B2 | 1/2006 | Fukuyo et al. |
| 7,396,742 B2 * | 7/2008 | Fukuyo et al. ............ 438/463 |
| 7,489,454 B2 | 2/2009 | Fukuyo et al. |
| 7,547,613 B2 | 6/2009 | Fukuyo et al. |
| 7,566,635 B2 | 7/2009 | Fujii et al. |
| 7,592,237 B2 | 9/2009 | Sakamoto et al. |
| 7,592,238 B2 | 9/2009 | Fukuyo et al. |
| 7,605,344 B2 | 10/2009 | Fukumitsu |
| 7,608,214 B2 | 10/2009 | Kuno et al. |
| 7,615,721 B2 | 11/2009 | Fukuyo et al. |
| 7,626,137 B2 | 12/2009 | Fukuyo et al. |
| 7,709,767 B2 | 5/2010 | Sakamoto |
| 7,718,510 B2 | 5/2010 | Sakamoto et al. |
| 7,719,017 B2 | 5/2010 | Tanaka |
| 7,732,730 B2 | 6/2010 | Fukuyo et al. |
| 7,749,867 B2 | 7/2010 | Fukuyo et al. |
| 7,754,583 B2 | 7/2010 | Sakamoto |
| 7,825,350 B2 | 11/2010 | Fukuyo et al. |
| 7,897,487 B2 | 3/2011 | Sugiura et al. |
| 7,902,636 B2 | 3/2011 | Sugiura et al. |
| 7,939,430 B2 | 5/2011 | Sakamoto et al. |
| 7,947,574 B2 | 5/2011 | Sakamoto et al. |
| 8,432,944 B2 * | 4/2013 | Romanovsky et al. .. 372/29.021 |
| 2005/0202596 A1 | 9/2005 | Fukuyo et al. |
| 2005/0272223 A1 | 12/2005 | Fujii et al. |
| 2006/0144828 A1 | 7/2006 | Fukumitsu et al. |
| 2006/0148212 A1 | 7/2006 | Fukuyo et al. |
| 2006/0255024 A1 | 11/2006 | Fukuyo et al. |
| 2007/0085099 A1 | 4/2007 | Fukumitsu et al. |
| 2007/0125757 A1 | 6/2007 | Fukuyo et al. |
| 2007/0158314 A1 | 7/2007 | Fukumitsu et al. |
| 2007/0252154 A1 | 11/2007 | Uchiyama et al. |
| 2008/0035611 A1 | 2/2008 | Kuno et al. |
| 2008/0037003 A1 | 2/2008 | Atsumi et al. |
| 2008/0090382 A1 | 4/2008 | Fujii et al. |
| 2008/0218735 A1 | 9/2008 | Atsumi et al. |
| 2008/0251506 A1 | 10/2008 | Atsumi et al. |
| 2009/0008373 A1 | 1/2009 | Muramatsu et al. |
| 2009/0032509 A1 | 2/2009 | Kuno et al. |
| 2009/0098713 A1 | 4/2009 | Sakamoto |
| 2009/0107967 A1 | 4/2009 | Sakamoto et al. |
| 2009/0117712 A1 | 5/2009 | Sakamoto et al. |
| 2009/0166808 A1 | 7/2009 | Sakamoto et al. |
| 2009/0250446 A1 | 10/2009 | Sakamoto |
| 2009/0261083 A1 | 10/2009 | Osajima et al. |
| 2009/0302428 A1 | 12/2009 | Sakamoto et al. |
| 2010/0006548 A1 | 1/2010 | Atsumi et al. |
| 2010/0009547 A1 | 1/2010 | Sakamoto |
| 2010/0012632 A1 | 1/2010 | Sakamoto |
| 2010/0012633 A1 | 1/2010 | Atsumi et al. |
| 2010/0015783 A1 | 1/2010 | Fukuyo et al. |
| 2010/0025386 A1 | 2/2010 | Kuno et al. |
| 2010/0032418 A1 | 2/2010 | Kuno et al. |
| 2010/0055876 A1 | 3/2010 | Fukuyo et al. |
| 2010/0151202 A1 | 6/2010 | Fukumitsu |
| 2010/0176100 A1 | 7/2010 | Fukuyo et al. |
| 2010/0184271 A1 | 7/2010 | Sugiura et al. |
| 2010/0200550 A1 | 8/2010 | Kumagai |
| 2010/0203678 A1 | 8/2010 | Fukumitsu et al. |
| 2010/0203707 A1 | 8/2010 | Fujii et al. |
| 2010/0227453 A1 | 9/2010 | Sakamoto |
| 2010/0240159 A1 | 9/2010 | Kumagai et al. |
| 2010/0258539 A1 | 10/2010 | Sakamoto |
| 2010/0301521 A1 | 12/2010 | Uchiyama |
| 2010/0311313 A1 | 12/2010 | Uchiyama |
| 2010/0327416 A1 | 12/2010 | Fukumitsu |
| 2011/0000897 A1 | 1/2011 | Nakano et al. |
| 2011/0001220 A1 | 1/2011 | Sugiura et al. |
| 2011/0021004 A1 | 1/2011 | Fukuyo et al. |
| 2011/0027971 A1 | 2/2011 | Fukuyo et al. |
| 2011/0027972 A1 | 2/2011 | Fukuyo et al. |
| 2011/0037149 A1 | 2/2011 | Fukuyo et al. |
| 2011/0274128 A1 | 11/2011 | Fukumitsu et al. |

FOREIGN PATENT DOCUMENTS

| | | |
|---|---|---|
| JP | 63-149513 | 6/1988 |
| JP | 2004-188422 | 7/2004 |
| JP | 2005-193286 | 7/2005 |
| WO | WO 2004/052586 | 6/2004 |

OTHER PUBLICATIONS

K. Miura et al., "Formation of Photo-Induced Structures in Glasses with Femtosecond Laser", Proceedings of $42^{nd}$ Laser Materials Processing Conference, Nov. 1997, pp. 105-111.

T. Sano et al., "Evaluation of Processing Characteristics of Silicon with Picosecond Pulse Laser", Preprints of the National Meeting of Japan Welding Society, No. 66, Apr. 2000, pp. 72-73 (with at least partial English translation).

U.S. Appl. No. 13/206,181, filed Aug. 9, 2011.
U.S. Appl. No. 13/269,274, filed Oct. 7, 2011.
U.S. Appl. No. 13/235,936, filed Sep. 19, 2011.
U.S. Appl. No. 13/213,175, filed Aug. 19, 2011.
U.S. Appl. No. 13/233,662, filed Sep. 15, 2011.
U.S. Appl. No. 13/061,438, filed Apr. 26, 2011.
U.S. Appl. No. 13/107,056, filed May 13, 2011.
U.S. Appl. No. 13/151,877, filed Jun. 2, 2011.
U.S. Appl. No. 13/131,429, filed Jun. 28, 2011.
U.S. Appl. No. 13/143,636, filed Sep. 21, 2011.
U.S. Appl. No. 13/148,097, filed Aug. 26, 2011.
U.S. Appl. No. 13/262,995, filed Oct. 5, 2011.
U.S. Appl. No. 13/265,027, filed Oct. 18, 2011.
U.S. Office Action dated Apr. 14, 2011, issued in U.S. Appl. No. 10/585,660, filed May 8, 2008.

* cited by examiner

Fig.19
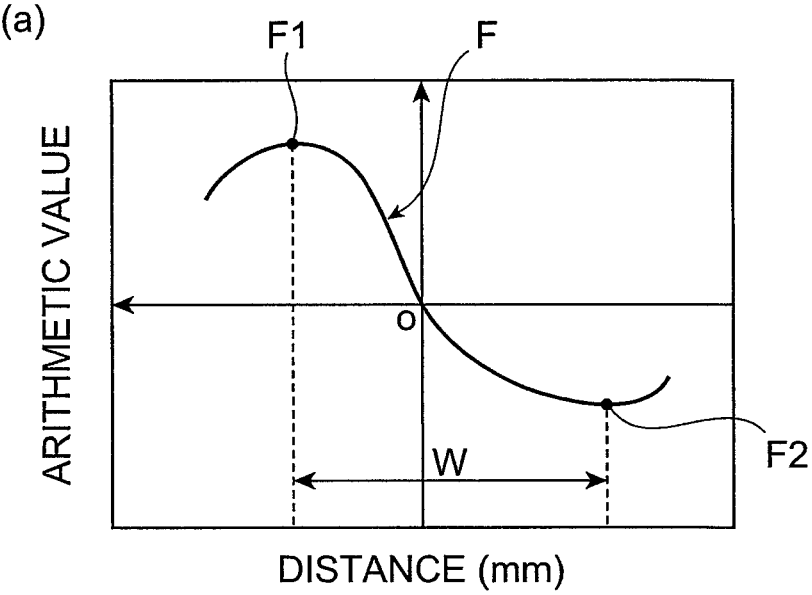
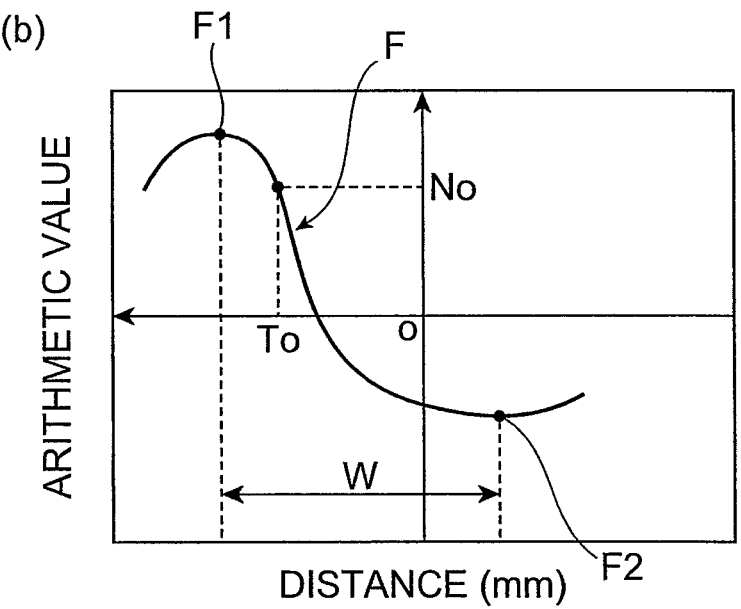

*Fig.20*
(a)
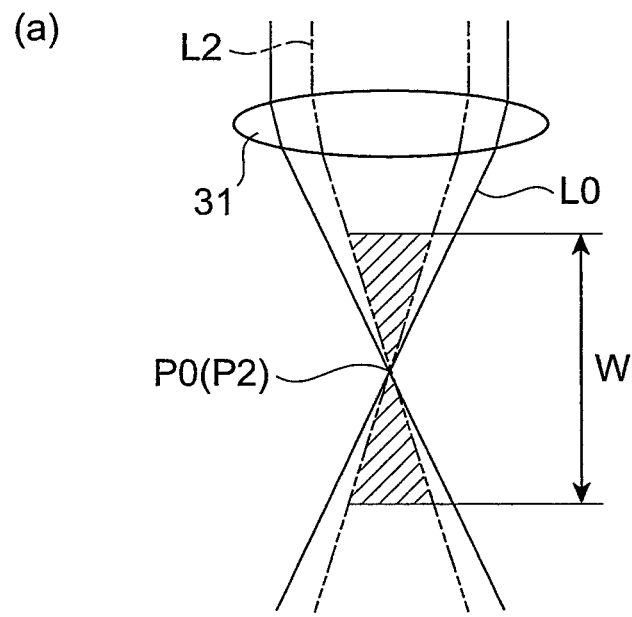
(b)
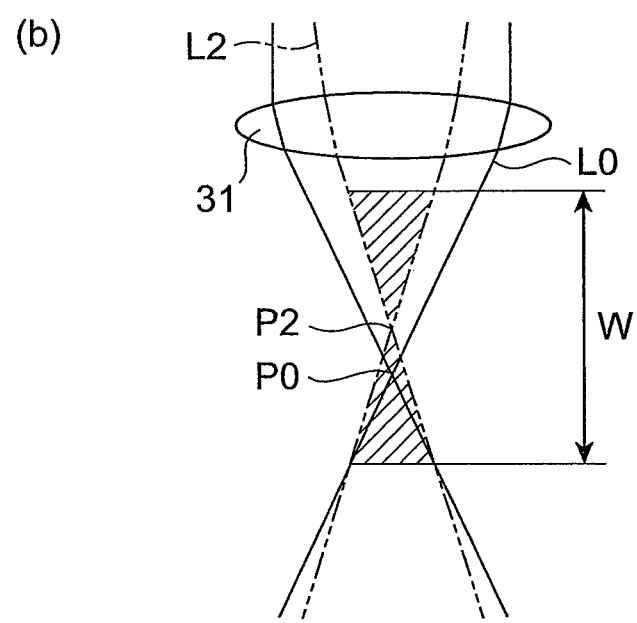

Fig.22
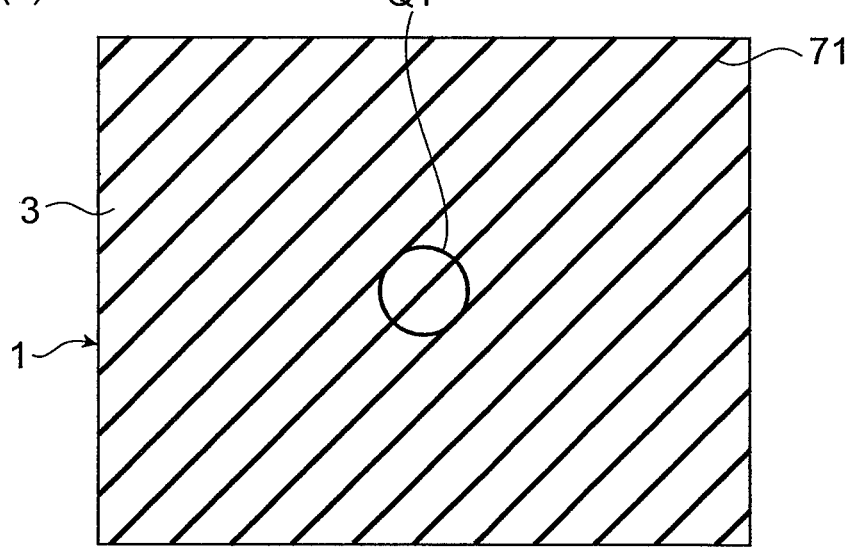
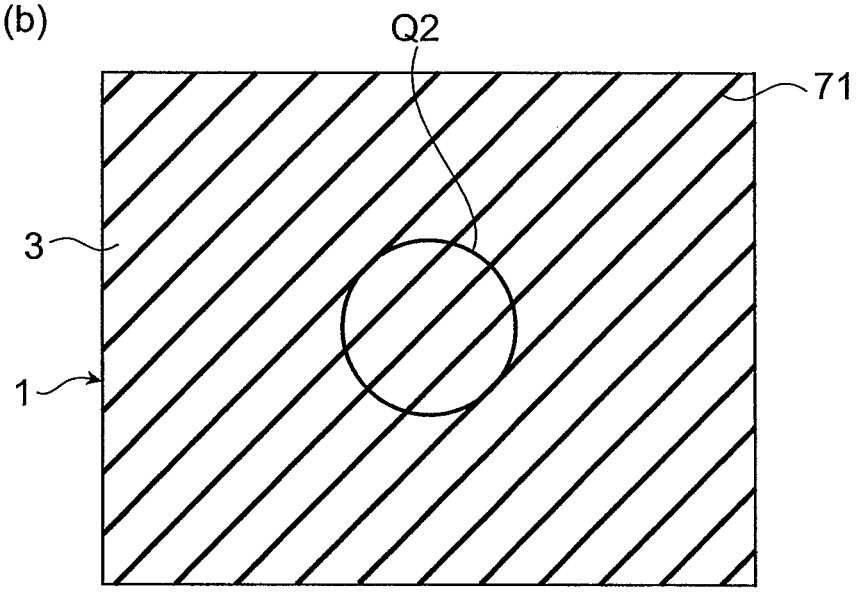

LASER MATERIAL PROCESSING SYSTEM

TECHNICAL FIELD

The present invention relates to a laser processing apparatus used for cutting an object to be processed along a line to cut.

BACKGROUND ART

As a conventional laser processing apparatus, one disclosed in Japanese Patent Application Laid-Open No. 2004-188422 has been known, for example. In this laser processing apparatus, while a converging lens converges first laser light (processing laser light) and second laser light (rangefinding laser light), converging point position control means detects reflected light of the second laser light reflected by a laser-light-irradiated surface of an object to be processed and regulates the position of the converging point of the first laser light. This makes it possible to position the converging point of the first laser light at a predetermined distance from the laser-light-irradiated surface and form a modified region within the object to be processed.

DISCLOSURE OF THE INVENTION

Problem to be Solved by the Invention

In laser processing apparatus such as the one mentioned above, it has been desired to form a modified region, which becomes a cutting start point, at a desirable position within the object to be processed more accurately in order to further improve the cutting quality of the object along a line to cut.

In view of such circumstances, it is an object of the present invention to provide a laser processing apparatus which can accurately form a modified region to become a cutting start point at a desirable position within an object to be processed.

Means for Solving Problem

For achieving the above-mentioned object, in one aspect, the laser processing apparatus in accordance with the present invention is a laser processing apparatus for forming a modified region to become a cutting start point within a planar object to be processed by irradiating the object with first laser light while locating a converging point within the object; the apparatus comprising a converging lens for converging the first laser light and second laser light to be reflected by a laser-light-irradiated surface irradiated with the first laser light in the object toward the object; driving means for actuating the converging lens along an optical axis direction thereof; astigmatism adding means for adding astigmatism to reflected light of the second laser light reflected by the laser-light-irradiated surface; a photodetector device for receiving the astigmatism-added reflected light of the second laser light reflected by the laser-light-irradiated surface in a split fashion and outputting respective output values corresponding to light quantities of reflected light components of the second laser light received in the split fashion; and control means for regulating the driving means such that the converging point of the first laser light is positioned at a predetermined distance from the laser-light-irradiated surface; wherein the second laser light is converged toward the object by the converging lens such as to have a converging point between a focal point of the converging lens and the converging lens; and wherein the control means regulates the driving means according to an arithmetic value acquired by subjecting the output values outputted from the photodetector device to a division by a sum of the output values and a predetermined arithmetic operation.

Since the converging point of the second laser light converged toward the object by the converging lens is positioned between the focal point of the converging lens and the converging lens in this laser processing apparatus, an area where the positional information concerning the position of the laser-light-irradiated surface is acquirable shifts toward the converging lens in the optical axis direction of the converging lens with reference to the focal point of the converging lens. This is because the positional information is acquired when a converged image of the reflected light of the second laser light changes, so that its acquirable area exists within an area symmetrical about the converging point of the second laser light. Consequently, when the second laser light is emitted simultaneously with the first laser light, they are emitted in a state where the focal point of the converging lens is located within the object, i.e., in a state where the laser-light-irradiated surface is closer to the converging lens than is the focal point of the converging lens, whereby the area where the positional information is acquirable can substantially be expanded. Therefore, the positional information of the laser-light-irradiated surface can accurately be acquired even when forming a modified region at a position deeper from the laser-light-irradiated surface, whereby the modified region can precisely be formed at a desirable position within the object.

Since the converging point of the second laser light converged toward the object by the converging lens is positioned between the focal point of the converging lens and the converging lens, the converged image of the second laser light has a larger area at the focal position of the converging lens. Consequently, even in the case where the laser-light-irradiated surface is a background surface having many cutting marks, for example, when emitting the second laser light while locating the focal position of the converging lens at the laser-light-irradiated surface before emitting the first laser light, the ratio of the cutting marks in the converged image is so small that adverse effects such as scattering of the reflected light of second laser light by the cutting marks on the laser-light-irradiated surface can be suppressed. Therefore, the positional information of the laser-light-irradiated surface can accurately be acquired, whereby a modified region can precisely be formed at a desirable position within the object.

The arithmetic value has been subjected to a division by the sum of output values outputted by a plurality of photodetector devices, and thus becomes a relative value to the total light quantity received. Consequently, even when the light quantity of the second laser light reflected by the laser-light-irradiated surface changes under the influence of the film thickness formed on the surface of the object, for example, so that the output value outputted by the photodetector device varies, the arithmetic value can be prevented from fluctuating, whereby a modified region can accurately be formed at a desirable position within the object.

When the driving means is regulated by the control means so as to attain a fixed arithmetic value here, the modified region to become a cutting start point can be positioned at a predetermined distance from the laser-light-irradiated surface.

In another aspect, the laser processing apparatus in accordance with the present invention is a laser processing apparatus for forming a modified region to become a cutting start point within a planar object to be processed along a line to cut the object by irradiating the object with first laser light while locating a converging point within the object with a converging lens; along with moving the converging lens along the line to cut relative to the object while causing the converging lens to converge the first laser light within the object, the apparatus causing the converging lens to converge second laser light to be reflected by a laser-light-irradiated surface irradiated with the first laser light in the object toward the object such that a converging point of the second laser light is positioned between a focal point of the converging lens and the converging lens; adding astigmatism to reflected light of the second laser light reflected by the laser-light-irradiated surface; receiving the astigmatism-added reflected light of the second laser light reflected by the laser-light-irradiated surface in a split fashion and outputting respective output values corresponding to light quantities of reflected light components of the second laser light received in the split fashion; and actuating the converging lens along an optical axis direction thereof such that the converging point of the first laser light is positioned at a predetermined distance from the laser-light-irradiated surface according to an arithmetic value acquired by subjecting the outputted values to a division by a sum of the output values and a predetermined arithmetic operation.

This laser processing apparatus emits the second laser light simultaneously with the first laser light, and thus can exhibit the above-mentioned effect of making it possible to substantially expand the area where the positional information is acquirable. Further, since the arithmetic value has been subjected to a division by the sum of output values outputted by a plurality of photodetector devices, the above-mentioned effect of making it possible to prevent the arithmetic value from fluctuating is exhibited. The foregoing allows a modified region to be formed accurately at a desirable position within the object.

In still another aspect, the laser processing apparatus in accordance with the present invention is a laser processing apparatus for forming a modified region to become a cutting start point within a planar object to be processed along a line to cut the object by irradiating the object with first laser light while locating a converging point within the object with a converging lens; along with moving the converging lens along the line to cut relative to the object while causing the converging lens to converge second laser light to be reflected by a laser-light-irradiated surface irradiated with the first laser light in the object such that a converging point of the second laser light is positioned between a focal point of the converging lens and the converging lens, the apparatus adding astigmatism to reflected light of the second laser light reflected by the laser-light-irradiated surface; receiving the astigmatism-added reflected light of the second laser light reflected by the laser-light-irradiated surface in a split fashion and outputting respective output values corresponding to light quantities of reflected light components of the second laser light received in the split fashion; actuating the converging lens along an optical axis direction thereof such that the converging point of the first laser light is positioned at a predetermined distance from the laser-light-irradiated surface according to an arithmetic value acquired by subjecting the outputted values to a division by a sum of the output values and a predetermined arithmetic operation, and acquiring actuation information concerning the actuation of the converging lens; and then, along with moving the converging lens along the line to cut relative to the object while converging the first laser light within the object with the converging lens, actuating the converging lens according to the actuation information acquired therebefore.

This laser processing apparatus emits the second laser light such that the converged image of the laser light has a larger area before emitting the first laser light, and thus can exhibit the above-mentioned effect of making it possible to suppress adverse effects such as scattering of the reflected light of second laser light by the cutting marks on the laser-light-irradiated surface. Since the arithmetic value has been subjected to a division by the sum of a plurality of output values outputted by a plurality of photodetector devices, the above-mentioned effect of making it possible to prevent the arithmetic value from fluctuating is exhibited. The foregoing allows a modified region to be formed accurately at a desirable position within the object.

EFFECT OF THE INVENTION

The present invention can accurately form a modified region to become a cutting start point at a desirable position within the object to be processed.

BRIEF DESCRIPTION OF THE DRAWINGS

FIG. 19 is a chart showing the arithmetic value with respect to the distance from the laser-light-irradiated surface to the focal point of the converging lens;

FIG. 20 is a view showing areas where positional information of the laser-light-irradiated surface is acquirable;

FIG. 22 is a view showing the converged image of rangefinding laser light on the laser-light-irradiated surface.

EXPLANATIONS OF NUMERALS OR LETTERS

1 . . . wafer (object to be processed); 3 . . . front face (laser light incident surface); 7 . . . modified region; 28 . . . actuator (driving means); 31 . . . converging lens; 40 . . . controller (control means); 42 . . . quadrant photodiode (photodetector device); 49 . . . shaping optical system (astigmatism adding means); L1 . . . processing laser light (first laser light); L2 . . . rangefinding laser light (second laser light); L3 . . . reflected light; P0 . . . focal point of the converging lens; P1 . . . converging point of the processing laser light; P2 . . . converging point of rangefinding laser light.

BEST MODES FOR CARRYING OUT THE INVENTION

In the following, a preferred embodiment of the present invention will be explained in detail with reference to the drawings. In the laser processing method in accordance with the embodiment, a phenomenon known as multiphoton absorption is used for forming a modified region within an object to be processed. Therefore, to begin with, a laser processing method for forming a modified region by the multiphoton absorption will be explained.

A material becomes transparent when its absorption bandgap $E_G$ is greater than photon energy hv. Consequently, a condition under which absorption occurs in the material is hv>$E_G$. However, even when optically transparent, the material generates absorption under a condition of nhv>$E_G$ (where n=2, 3, 4, . . . ) if the intensity of laser light becomes very high. This phenomenon is known as multiphoton absorption. In the case of pulsed waves, the intensity of laser light is determined by the peak power density (W/cm$^2$) of laser light at its converging point. The multiphoton absorption occurs under a condition where the peak power density is 1×10$^8$ (W/cm$^2$) or greater, for example. The peak power density is determined by (energy of laser light at the converging point per pulse)/(beam spot cross-sectional area of laser light×pulse width). In the case of continuous waves, the intensity of laser light is determined by the field intensity (W/cm$^2$) of laser light at the converging point.

Figure 1:
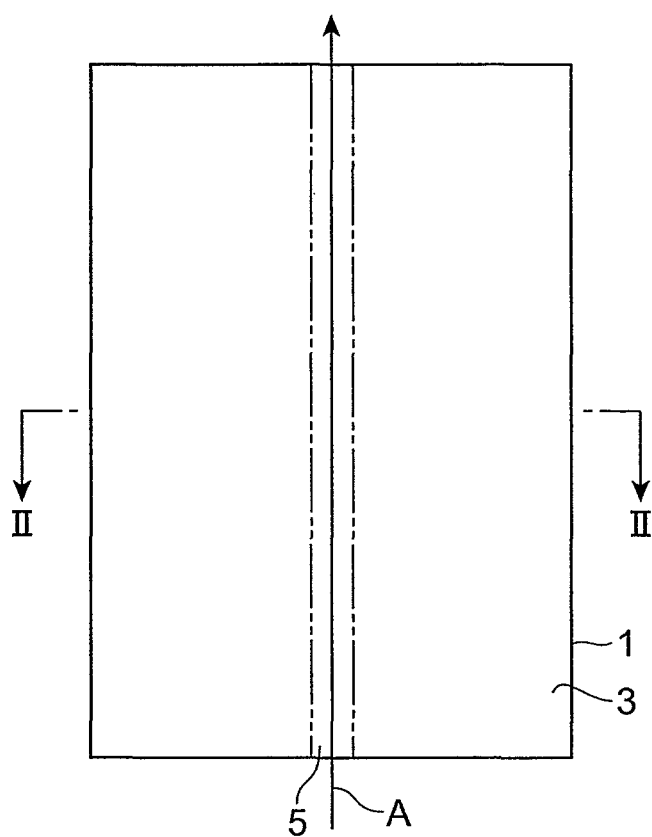
FIG. 1 is a plan view of an object to be processed during laser processing by a laser processing apparatus in accordance with an embodiment.
Figure 2:
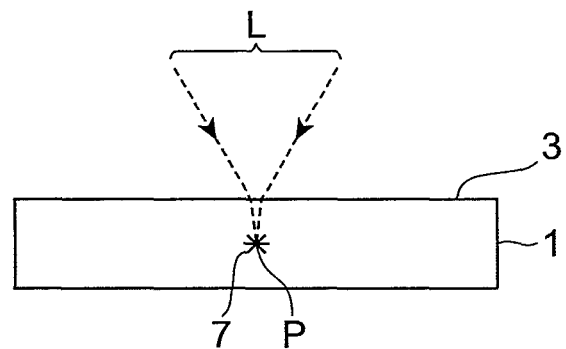
FIG. 2 is a sectional view of the object taken along the line II-II of FIG. 1.

The principle of the laser processing method in accordance with an embodiment using such multiphoton absorption will be explained with reference to FIGS. 1 to 6. As shown in FIG. 1, on a front face 3 of a wafer-shaped (planar) wafer 1, a line to cut 5 for cutting the wafer 1 exists. The line to cut 5 is a virtual line extending straight. As shown in FIG. 2, the laser processing method in accordance with this embodiment irradiates the wafer 1 with laser light L while locating a converging point P therewithin under a condition generating multiphoton absorption, so as to form a modified region 7. The converging point P is a position at which the laser light L is converged. The line to cut 5 may be curved instead of being straight, and may be a line actually drawn on the wafer 1 without being restricted to the virtual line.

Figure 3:
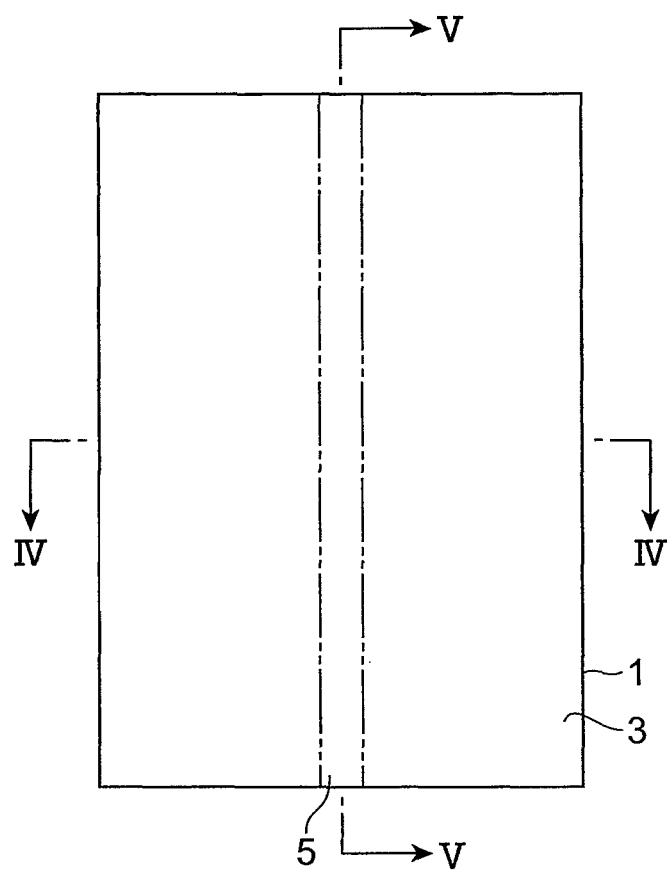
FIG. 3 is a plan view of the object after the laser processing by the laser processing apparatus in accordance with the embodiment.
Figure 4:
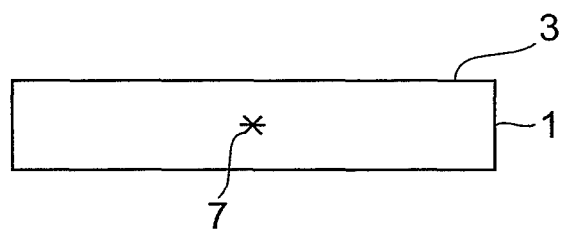
FIG. 4 is a sectional view of the object taken along the line IV-IV of FIG. 3.
Figure 5:
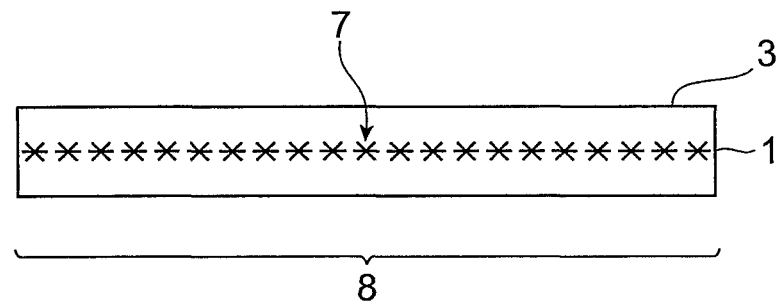
FIG. 5 is a sectional view of the object taken along the line V-V of FIG. 3.

Then, the laser light L is relatively moved along the line to cut 5 (i.e., in the direction of arrow A in FIG. 1), so as to shift the converging point P along the line to cut 5. Consequently, as shown in FIGS. 3 to 5, the modified region 7 is formed along the line to cut 5 within the wafer 1, and becomes a starting point for cutting 8. The starting point for cutting 8 refers to a region which becomes a start point for cutting (fracturing) when the wafer 1 is cut. The starting point for cutting 8 may be made by forming the modified region 7 either continuously or intermittently.

In the laser processing method in accordance with this embodiment, the front face 3 of the wafer 1 hardly absorbs the laser light L and thus does not melt.

Figure 6:
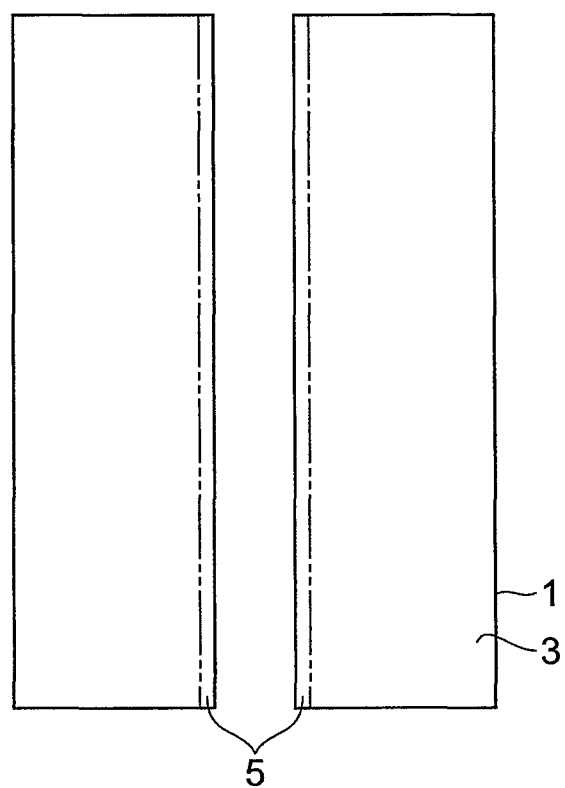
FIG. 6 is a plan view of the object cut by the laser processing apparatus in accordance with the embodiment.

Forming the starting point for cutting 8 within the wafer 1 makes it easier to generate fractures from the starting point for cutting 8 acting as a start point, whereby the wafer 1 can be cut with a relatively small force as shown in FIG. 6. Therefore, the wafer 1 can be cut with a high precision without generating unnecessary fractures on the front face 3 of the wafer 1.

There seem to be the following two ways of cutting the wafer 1 from the starting point for cutting 8 acting as a start point. The first case is where an artificial force is applied to the wafer 1 after the starting point for cutting 8 is formed, so that the wafer 1 fractures from the starting point for cutting 8 acting as a start point, whereby the wafer 1 is cut. This is the cutting in the case where the wafer 1 has a large thickness, for example. Applying an artificial force refers to exerting a bending stress or shear stress to the wafer 1 along the starting point for cutting 8, or generating a thermal stress by applying a temperature difference to the wafer 1, for example. The other case is where the forming of the starting point for cutting 8 causes the wafer 1 to fracture naturally in its cross-sectional direction (thickness direction) from the starting point for cutting 8 acting as a start point, thereby cutting the wafer 1. This becomes possible, for example, if the starting point for cutting 8 is formed by one row of the modified region 7 when the wafer 1 has a small thickness, or if the starting point for cutting 8 is formed by a plurality of rows of the modified region 7 in the thickness direction when the wafer 1 has a large thickness. Even in this naturally fracturing case, fractures do not extend onto the front face 3 at a portion corresponding to an area not formed with the starting point for cutting 8 in the part to cut, so that only the portion corresponding to the area formed with the starting point for cutting 8 can be cleaved, whereby cleavage can be controlled well. Such a cleaving method with favorable controllability is very effective, since the wafer 1 such as silicon wafer has recently been apt to decrease its thickness.

The modified region formed by multiphoton absorption in the laser processing method in accordance with this embodiment encompasses the following cases (1) to (3):

(1) Case Where the Modified Region is a Crack Region Including One Crack or a Plurality of Cracks An object to be processed (e.g., glass or a piezoelectric material made of LiTaO$_3$) is irradiated with laser light while locating a converging point therewithin under a condition with a field intensity of at least 1×10$^8$ (W/cm$^2$) at the converging point and a pulse width of 1 μs or less. This magnitude of pulse width is a condition under which a crack region can be formed only within the object while generating multiphoton absorption without causing unnecessary damages on the front face of the object. This generates a phenomenon of optical damage by multiphoton absorption within the object. This optical damage induces a thermal distortion within the object, thereby forming a crack region therewithin. The upper limit of field intensity is $1 \times 10^{12}$ (W/cm$^2$), for example. The pulse width is preferably 1 ns to 200 ns, for example. The forming of a crack region by multiphoton absorption is disclosed, for example, in "Internal Marking of Glass Substrate with Solid-state Laser", Proceedings of the 45th Laser Materials Processing Conference (December 1998), pp. 23-28.

The inventors determined the relationship between field intensity and crack size by an experiment. The following are conditions of the experiment.

(A) Object to be processed: Pyrex (registered trademark) glass (with a thickness of 700 µm)

(B) Laser light source: semiconductor laser pumping Nd:YAG laser wavelength: 1064 nm laser light spot cross-sectional area: $3.14 \times 10^{-8}$ cm$^2$ oscillation mode: Q-switched pulse repetition frequency: 100 kHz pulse width: 30 ns output: output <1 mJ/pulse laser light quality: TEM$_{00}$ polarizing property: linear polarization (C) Converging lens transmittance at a laser light wavelength: 60%

(D) Moving rate of the mount table mounting the object: 100 mm/sec

The laser light quality of TEM$_{00}$ means that the converging characteristic is so high that convergence to about the wavelength of laser light is possible.

Figure 7:
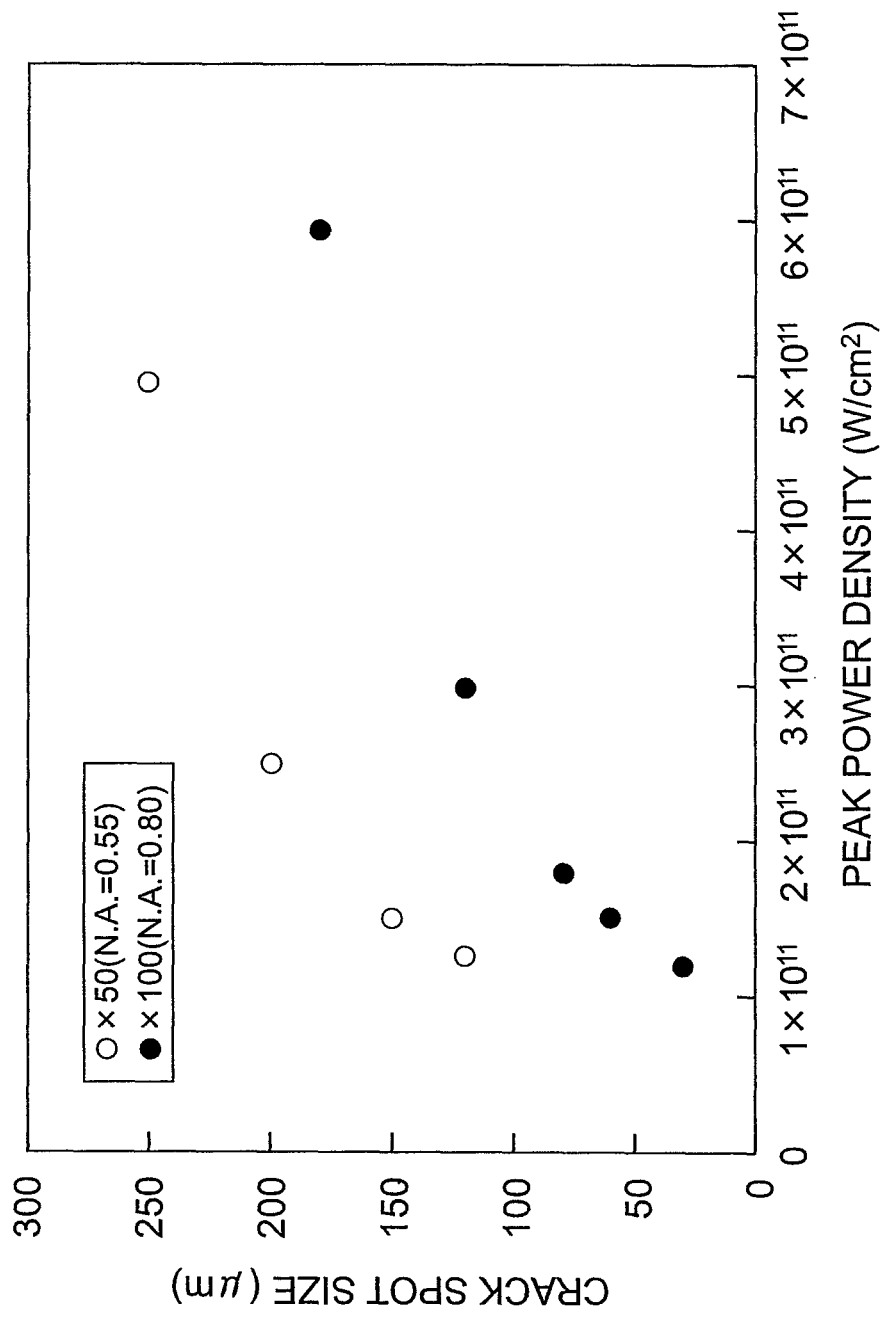
FIG. 7 is a graph showing relationships between the field intensity and crack spot size in the laser processing apparatus in accordance with the embodiment.

FIG. 7 is a graph showing the results of the above-mentioned experiment. The abscissa indicates the peak power density. Since the laser light is pulsed laser light, the field intensity is represented by the peak power density. The ordinate indicates the size of a crack part (crack spot) formed within the object by one pulse of laser light. Crack spots gather to yield a crack region. The crack spot size is the size of a part yielding the maximum length among forms of crack spots. Data represented by black circles in the graph refer to a case where the condenser lens (C) has a magnification of ×100 and a numerical aperture (NA) of 0.80. On the other hand, data represented by whitened circles in the graph refer to a case where the condenser lens (C) has a magnification of ×50 and a numerical aperture (NA) of 0.55. Crack spots are seen to occur within the object from when the peak power density is about $10^{11}$ (W/cm$^2$) and become greater as the peak power density increases.

Figure 8:
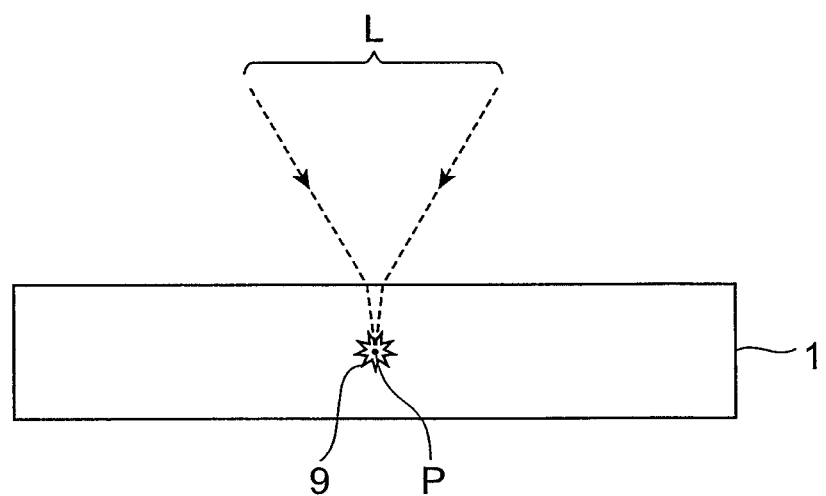
FIG. 8 is a sectional view of the object in a first step of the laser processing apparatus in accordance with the embodiment.
Figure 9:
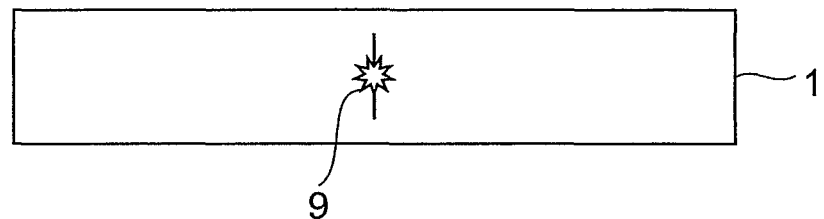
FIG. 9 is a sectional view of the object in a second step of the laser processing apparatus in accordance with the embodiment.
Figure 10:
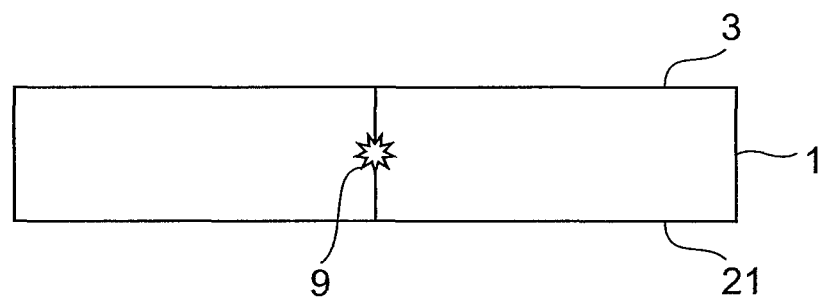
FIG. 10 is a sectional view of the object in a third step of the laser processing apparatus in accordance with the embodiment.
Figure 11:
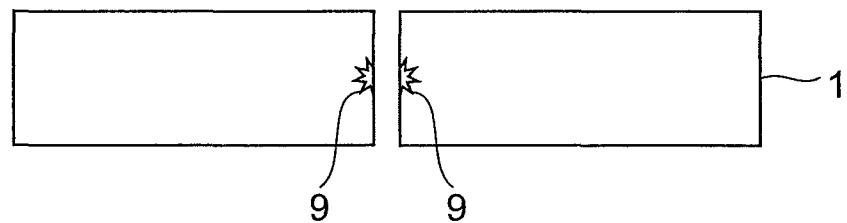
FIG. 11 is a sectional view of the object in a fourth step of the laser processing apparatus in accordance with the embodiment.

A mechanism by which the object to be processed is cut by forming a crack region will now be explained with reference to FIGS. 8 to 11. As shown in FIG. 8, the wafer 1 is irradiated with laser light L while the converging point P is located within the wafer 1 under a condition where multiphoton absorption occurs, so as to form a crack region 9 therewithin along a line to cut 5. The crack region 9 is a region containing one crack or a plurality of cracks. Thus formed crack region 9 becomes a starting point for cutting. As shown in FIG. 9, a crack further grows from the crack region 9 acting as a start point (i.e., from the starting point for cutting acting as a start point), and reaches the front face 3 and rear face 21 of the wafer 1 as shown in FIG. 10, whereby the wafer 1 fractures and is consequently cut as shown in FIG. 11. The crack reaching the front face 3 and rear face 21 of the wafer 1 may grow naturally or as a force is applied to the wafer 1.

(2) Case Where the Modified Region is a Molten Processed Region

An object to be processed (e.g., semiconductor material such as silicon) is irradiated with laser light while locating a converging point within the object under a condition with a field intensity of at least $1 \times 10^8$ (W/cm$^2$) at the converging point and a pulse width of 1 µs or less. As a consequence, the inside of the object is locally heated by multiphoton absorption. This heating forms a molten processed region within the object. The molten processed region encompasses regions once molten and then re-solidified, regions just in a molten state, and regions in the process of being re-solidified from the molten state, and can also be referred to as a region whose phase has changed or a region whose crystal structure has changed. The molten processed region may also be referred to as a region in which a certain structure changes to another structure among monocrystal, amorphous, and polycrystal structures. For example, it means a region having changed from the monocrystal structure to the amorphous structure, a region having changed from the monocrystal structure to the polycrystal structure, or a region having changed from the monocrystal structure to a structure containing amorphous and polycrystal structures. When the object to be processed is of a silicon monocrystal structure, the molten processed region is an amorphous silicon structure, for example. The upper limit of field intensity is $1 \times 10^{12}$ (W/cm$^2$), for example. The pulse width is preferably 1 ns to 200 ns, for example.

By an experiment, the inventors verified that a molten processed region was formed within a silicon wafer. The following are conditions of the experiment.

(A) Object to be processed: silicon wafer (with a thickness of 350 µm and an outer diameter of 4 inches)

(B) Laser light source: semiconductor laser pumping Nd:YAG laser wavelength: 1064 nm laser light spot cross-sectional area: $3.14 \times 10^{-8}$ cm$^2$ oscillation mode: Q-switched pulse repetition frequency: 100 kHz pulse width: 30 ns output: 20 µJ/pulse laser light quality: TEM$_{00}$ polarizing property: linear polarization (C) Converging lens magnification: ×50

N.A.: 0.55 transmittance at a laser light wavelength: 60%

(D) Moving rate of the mount table mounting the object: 100 mm/sec

Figure 12:
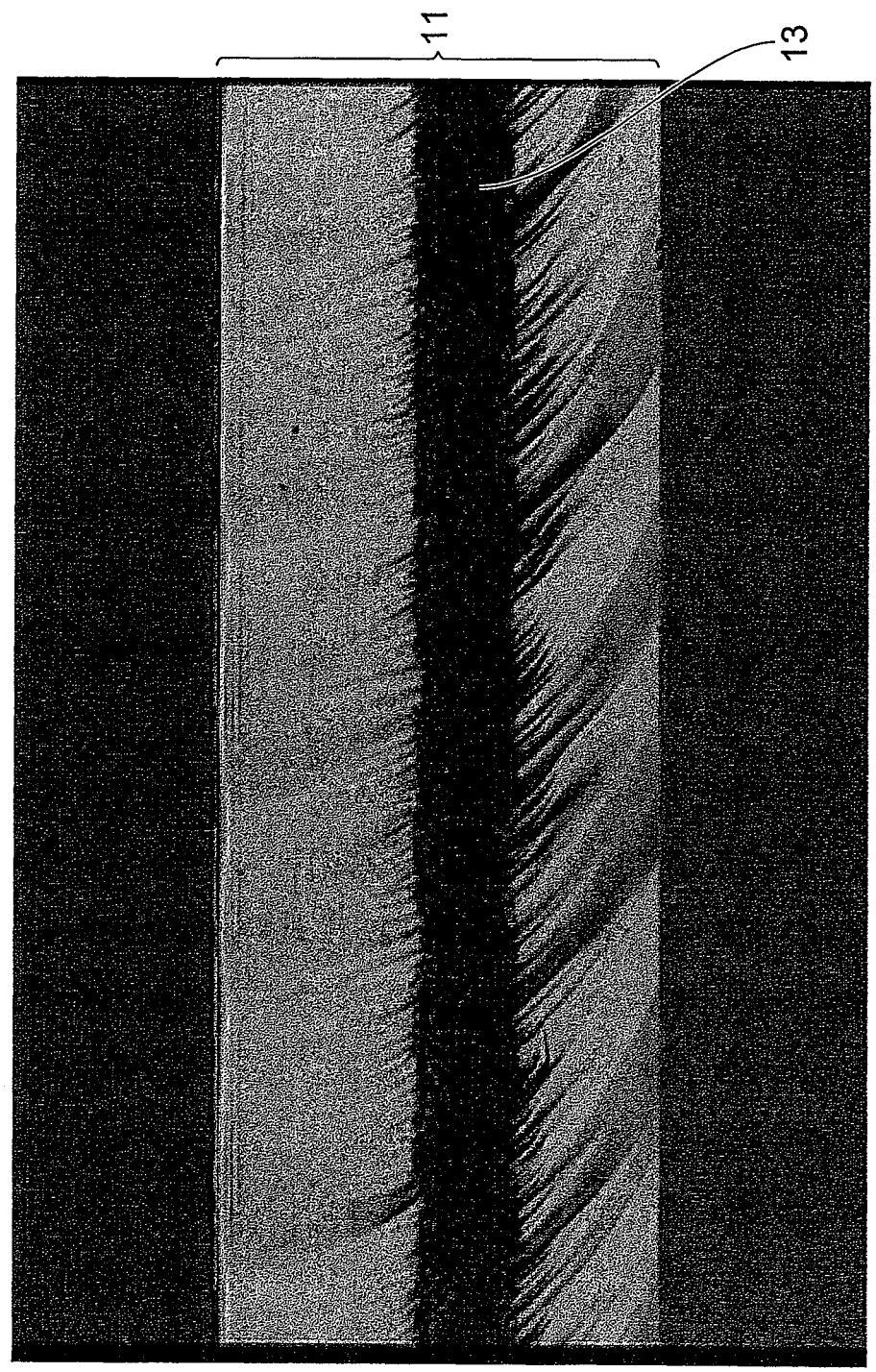
FIG. 12 is a view showing a photograph of a cut section in a part of a silicon wafer cut by the laser processing apparatus in accordance with the embodiment.

FIG. 12 is a view showing a photograph of a cross section of a part of a silicon wafer cut by laser processing under the conditions mentioned above. A molten processed region 13 is formed within the silicon wafer 11. The molten processed region 13 formed under the above-mentioned conditions has a size of about 100 µm in the thickness direction.

Figure 13:
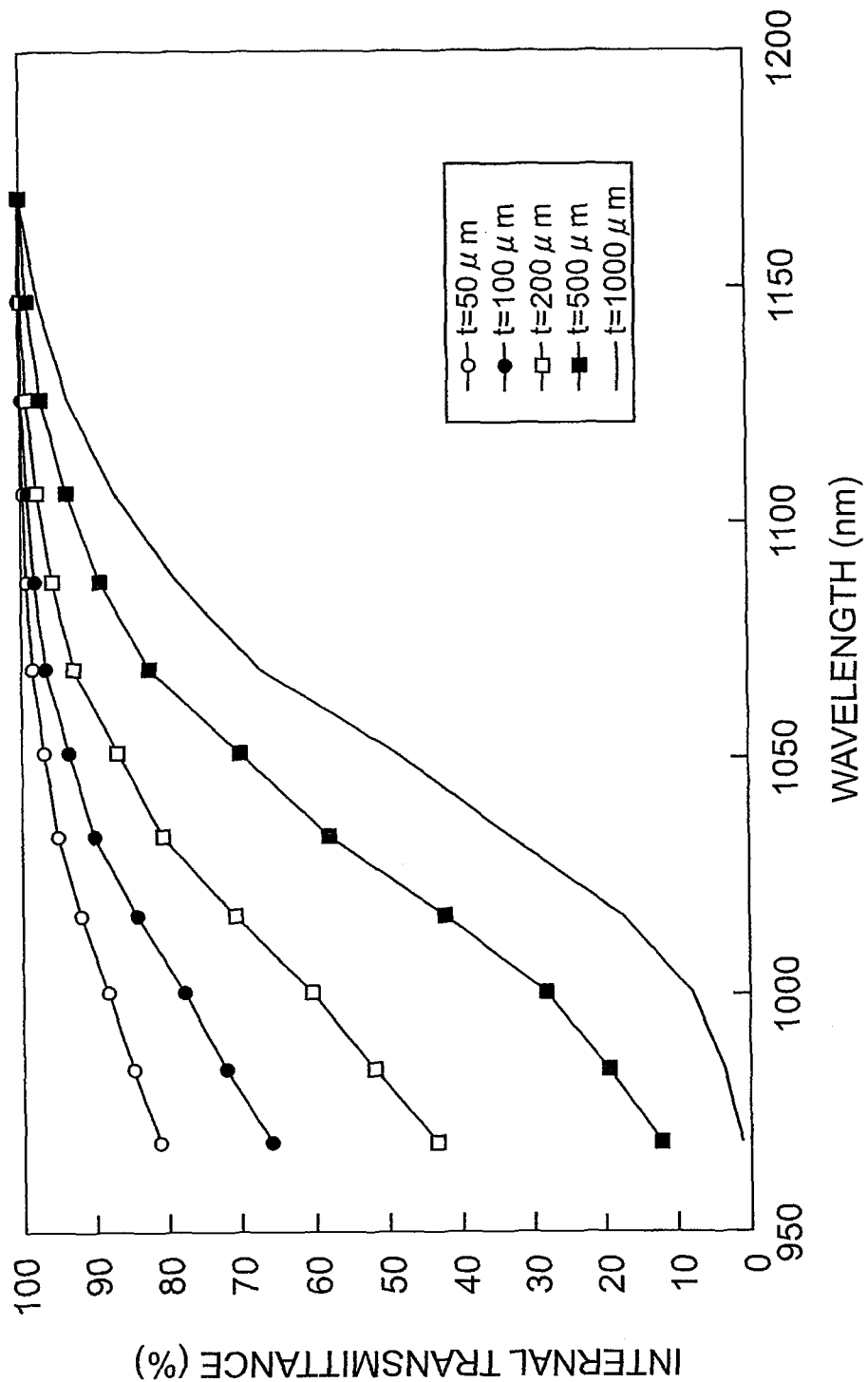
FIG. 13 is a graph showing relationships between the laser light wavelength and the transmittance within a silicon substrate in the laser processing apparatus in accordance with the embodiment.

The fact that the molten processed region 13 is formed by multiphoton absorption will now be explained. FIG. 13 is a graph showing relationships between the laser light wavelength and the transmittance within the silicon substrate. Here, the respective reflected components on the front and rear sides of the silicon substrate are eliminated, so as to show the internal transmittance alone. The respective relationships are shown in the cases where the thickness t of the silicon substrate is 50 µm, 100 µm, 200 µm, 500 µm, and 1000 µm.

For example, at the Nd:YAG laser wavelength of 1064 nm, the laser light appears to be transmitted through the silicon substrate by at least 80% when the silicon substrate has a thickness of 500 µm or less. Since the silicon wafer 11 shown in FIG. 12 has a thickness of 350 μm, the molten processed region 13 caused by multiphoton absorption is formed near the center of the silicon wafer 11, i.e., at a part distanced from the front face by 175 μm. The transmittance in this case is 90% or more with reference to a silicon wafer having a thickness of 200 μm, whereby the laser light is absorbed only slightly within the silicon wafer 11 and is substantially transmitted therethrough. This means that the molten processed region 13 is formed within the silicon wafer 11 not by laser light absorption within the silicon wafer 11 (i.e., not by usual heating with the laser light) but by multiphoton absorption. The forming of a molten processed region by multiphoton absorption is disclosed, for example, in "Silicon Processing Characteristic Evaluation by Picosecond Pulse Laser", Preprints of the National Meetings of Japan Welding Society, Vol. 66 (April 2000), pp. 72-73.

A fracture is generated in a silicon wafer from a starting point for cutting formed by a molten processed region, acting as a start point, toward a cross section, and reaches the front and rear faces of the silicon wafer, whereby the silicon wafer is cut. The fracture reaching the front and rear faces of the silicon wafer may grow naturally or as a force is applied to the silicon wafer. The fracture naturally growing from the starting point for cutting to the front and rear faces of the silicon wafer encompasses a case where the fracture grows from a state where the molten processed region forming the starting point for cutting is molten and a case where the fracture grows when the molten processed region forming the starting point for cutting is re-solidified from the molten state. In either case, the molten processed region is formed only within the silicon wafer, and thus is present only within the cut section after cutting as shown in FIG. 12. When a starting point for cutting is thus formed within the object by a molten processed region, unnecessary fractures deviating from a starting point for cutting line are harder to occur at the time of cleaving, whereby cleavage control becomes easier. By the way, the molten processed region is formed because of not only multiphoton absorption but also other absorbing actions.

(3) Case Where the Modified Region is a Refractive Index Changed Region

An object to be processed (e.g., glass) is irradiated with laser light while locating a converging point within the object under a condition with a field intensity of at least $1 \times 10^8$ (W/cm$^2$) at the converging point and a pulse width of 1 ns or less. When multiphoton absorption is generated within the object with a very short pulse width, the energy caused by multiphoton absorption is not converted into thermal energy, whereby an eternal structure change such as ion valence change, crystallization, or orientation polarization is induced within the object, thus forming a refractive index change region. The upper limit of field intensity is $1 \times 10^{12}$ (W/cm$^2$), for example. The pulse width is preferably 1 ns or less, for example, more preferably 1 ps or less. The forming of a refractive index change region by multiphoton absorption is disclosed, for example, in "Forming of Photoinduced Structure within Glass by Femtosecond Laser Irradiation", Proceedings of the 42nd Laser Materials Processing Conference (November 1997), pp. 105-111.

With the cases (1) to (3) being explained in the foregoing as a modified region formed by multiphoton absorption, a starting point for cutting may be formed as follows while taking account of the crystal structure of a wafer-like object to be processed and its cleavage characteristic, whereby the object can be cut with a high precision by a smaller force from the starting point for cutting acting as a start point.

Namely, in the case of a substrate made of a monocrystal semiconductor having a diamond structure such as silicon, it will be preferred if a starting point for cutting is formed in a direction extending along a (111) plane (first cleavage plane) or a (110) plane (second cleavage plane). In the case of a substrate made of a III-V family compound semiconductor of sphalerite structure such as GaAs, it will be preferred if a starting point for cutting is formed in a direction extending along a (110) plane. In the case of a substrate having a crystal structure of hexagonal system such as sapphire (Al$_2$O$_3$), it will be preferred if a starting point for cutting is formed in a direction extending along a (1120) plane (A plane) or a (1100) plane (M plane) while using a (0001) plane (C plane) as a principal plane.

When the substrate is formed with an orientation flat in a direction to be formed with the above-mentioned starting point for cutting (e.g., a direction extending along a (111) plane in a monocrystal silicon substrate) or a direction orthogonal to the direction to be formed therewith, the starting point for cutting extending in the direction to be formed with the starting point for cutting can be formed in the substrate easily and accurately with reference to the orientation flat.

The laser processing apparatus in accordance with this embodiment will now be explained with reference to FIGS. 14 and 15.

Figure 14:
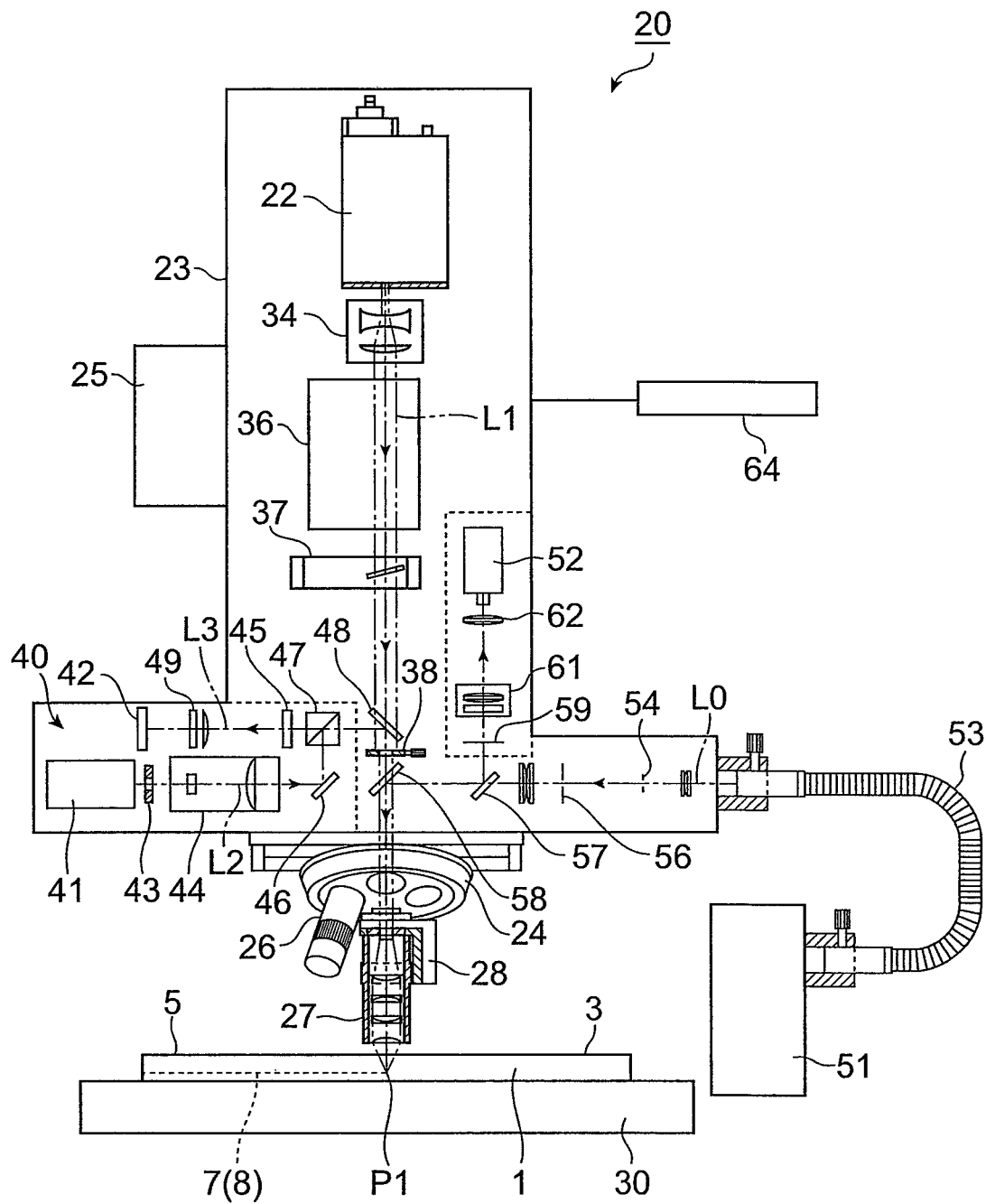
FIG. 14 is a schematic diagram of the laser processing apparatus in accordance with the embodiment.

As shown in FIG. 14, the laser processing apparatus 20 is an apparatus which irradiates a wafer 1, which is a planar object to be processed, with processing laser light (first laser light) L1 while locating a converging point P within the wafer 1, so as to form a modified region 7 to become a cutting start point within the wafer 1, and causes the modified region 7 to form a starting point for cutting 8 extending along a line to cut 5. The wafer 1 is a semiconductor wafer such as silicon wafer, whereas the modified region 7 is a molten processed region.

This laser processing apparatus 20 has a stage 30 on which the wafer 1 is mounted, whereas the stage 30 is movable in X direction (depicted horizontal direction) and θ direction which is a rotation direction about Z direction (depicted vertical direction). Arranged above the stage 30 are a housing 23 accommodating a laser light source 22 for generating the processing laser light L1 and the like, and a housing driving part 25 for actuating the housing 23 in Y direction (direction perpendicular to X and Z axes) and Z direction. Here, the laser light source 22 is one using Nd:YAG laser, for example, and emits the processing laser light L1 having a pulse width of 1 μs or less, which is pulsed laser light, toward the wafer 1 on the stage 30 positioned directly thereunder.

An electric revolver 24 is attached to the lower end face of the housing 23, whereas a viewing objective lens 26 for observing the wafer 1 and a processing objective lens 27 for converging the processing laser light L1 are mounted to the electric revolver 24. Rotating the electric revolver 24 aligns the respective optical axes of the objective lenses 26, 27 with the optical axis of the processing laser light L1. Interposed between the processing objective lens 27 and the electric revolver 24 is an actuator (driving means) 28 using a piezoelectric device, for example, which finely adjusts the position of the processing objective lens 27 in Z direction.

Figure 15:
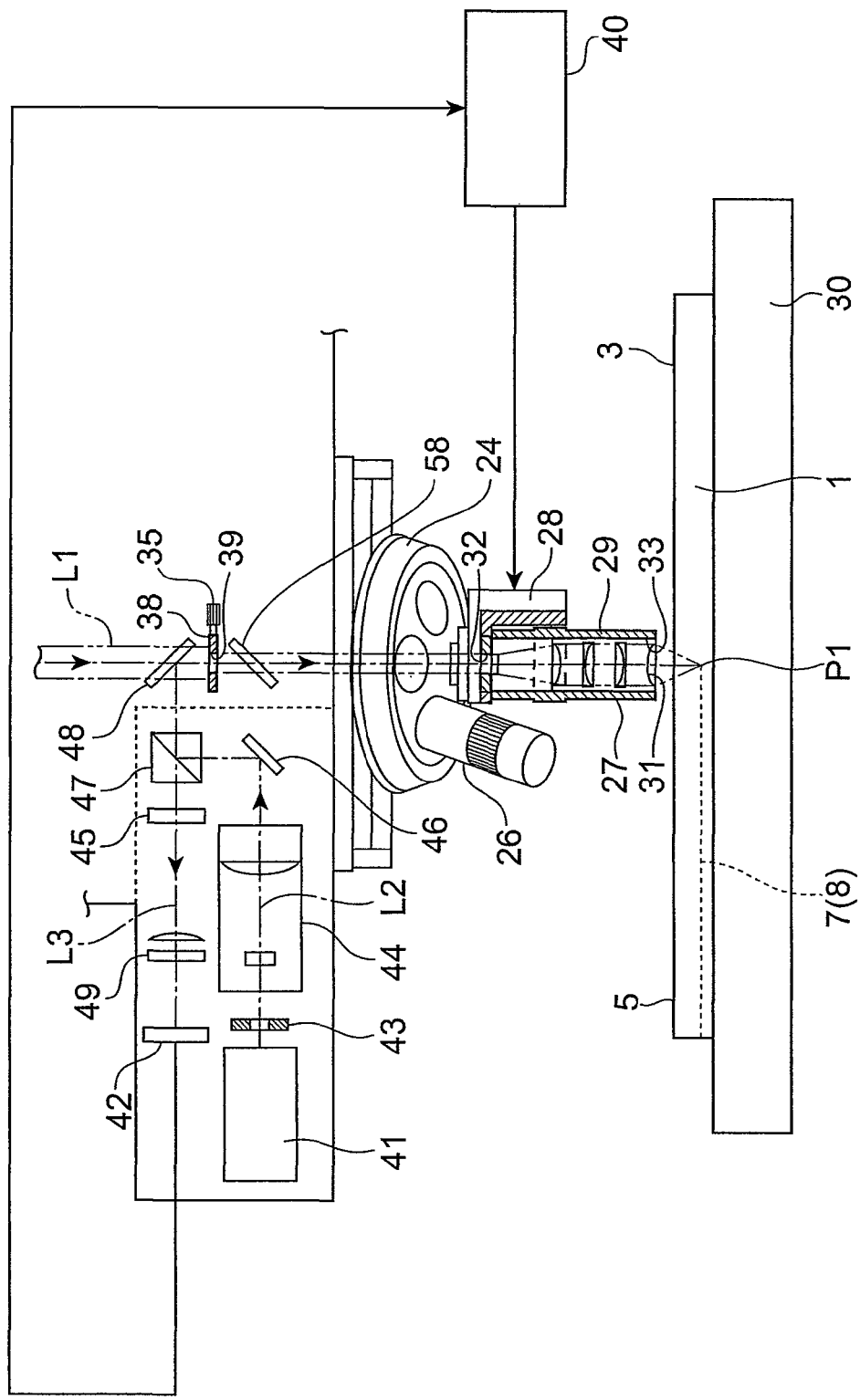
FIG. 15 is a schematic diagram concerning the processing laser light and rangefinding laser light in the laser processing apparatus shown in FIG. 14.

As shown in FIG. 15, the processing objective lens 27 has a cylindrical lens holder 29, which holds therewithin a converging lens 31 having a numerical aperture of 0.80 formed by assembling a plurality of lenses. The upper end part of the lens holder 29 is formed with an entrance opening 32 as an entrance pupil for the converging lens 31, whereas the lower end part of the lens holder 29 is formed with an emission opening 33 for the processing laser light L1. Thus constructed processing objective lens 27 converges the processing laser light L1, whereby the peak power density of the processing laser light L1 at the converging point P1 due to the converging lens 31 becomes $1\times10^8$ (W/cm$^2$) or greater.

On the optical axis of the processing laser light L1 within the housing 23, as shown in FIG. 14, a beam expander 34 for expanding the beam size of the processing laser light L1 generated by the laser light source 22, a laser light adjustment optical system 36 for adjusting the output and polarization of the processing laser light L1, an electromagnetic shutter 37 for transmitting or blocking the processing laser light L1, and a diaphragm member 38 for narrowing the beam size of the processing laser light L1 are arranged in this order from the upper side to the lower side.

As shown in FIG. 15, the diaphragm member 38 is positioned above the entrance opening 32 of the processing objective lens 27 and is attached to the housing 23, while having an aperture 39 for narrowing and passing the processing laser light L1 on the optical axis of the processing laser light L1. The aperture 39 is formed with an opening size which is the same as or smaller than that of the entrance opening 32 of the processing objective lens 27, while the center axis of the aperture 39 can accurately be aligned with the center axis of the entrance opening 32 by an adjustment screw provided with the diaphragm member 38.

This diaphragm member 38 cuts the outer peripheral part of the processing laser light L1 greater than the aperture 39, so that the amount of processing laser light L1 cut by the peripheral part of the entrance opening 32 in the processing objective lens 27 is substantially eliminated, whereby the positional fluctuation of the converging point P of the processing laser light L1 mainly due to the heating of the lens holder 29 during the laser processing is kept low.

For observing the wafer 1 mounted on the stage 30, as shown in FIG. 14, the laser processing apparatus 20 has a viewing light source 51 for generating viewing visible light L0 on the outside of the housing 23 and a CCD camera 52 within the housing 23.

The viewing visible light L0 generated by the viewing light source 51 is guided into the housing 23 by a light guide 53 made of an optical fiber, passes a field stop 54, an aperture stop 56, a dichroic mirror 57, and the like in succession, and then is reflected by a dichroic mirror 58 arranged between the diaphragm member 38 and the entrance opening 32 of the processing objective lens 27. The reflected viewing visible light L0 advances downward on the optical axis of the processing laser light L1, passes the viewing objective lens 26 arranged on the optical axis of the processing laser light L1 by a rotation of the electric revolver 24, and irradiates the wafer 1. Meanwhile, not only the processing laser light L1 but also rangefinding laser light L2 and its reflected light L3 which will be explained later are transmitted through the dichroic mirror 58.

The reflected light of the viewing visible light L0 reflected by the front face 3 of the wafer 1 enters the viewing objective lens 26 again, advances upward on the optical axis of the processing laser light L1, and then is reflected by the dichroic mirror 58. The light reflected by the dichroic mirror 58 is further reflected by the dichroic mirror 57, passes a filter 59, an imaging lens 61, and a relay lens 62 in succession, and enters the CCD camera 52. Images of the front face 3 of the wafer 1 captured by the CCD camera 52 and the like are displayed on a TV monitor 64.

The laser processing apparatus 20 further has a laser light source 41 using a laser diode, for example. As shown in FIG. 14, the rangefinding laser light (second laser light) L2 generated by the laser light source 41 passes a pinhole 43 and a beam expander 44 in succession, and then is successively reflected by a mirror 46 and a half mirror 47, so as to be guided to a dichroic mirror 48 arranged between the electromagnetic shutter 37 and the diaphragm member 38. The rangefinding laser light L2 reflected by the dichroic mirror 48 advances downward on the optical axis of the processing laser light L1, passes the aperture 39 of the diaphragm member 38, and then is converged by the converging lens 31 of the processing objective lens 27, so as to irradiate the wafer 1. Meanwhile, the processing laser light L1 is transmitted through the dichroic mirror 48.

The reflected light L3 of rangefinding laser light reflected by the front face (laser-light-irradiated surface) 3 of the wafer 1 enters the converging lens 31 of the processing objective lens 27 again, advances upward on the optical axis of the processing laser light L1, passes the aperture 39 of the diaphragm member 38, and then is reflected by the dichroic mirror 48. The reflected light L3 of rangefinding laser light reflected by the dichroic mirror 48 passes the half mirror 47 and a filter 45 in succession. This filter 45, which is adapted to transmit or reflect light depending on its wavelength, passes the reflected light L3 of rangefinding laser light but blocks the reflected light of processing laser light L1 reflected by the front face 3 and rear face 17 of the wafer 1. A shaping optical system (astigmatism adding means) 49 constructed by a cylindrical lens and a planoconvex lens converges the reflected light L3 of rangefinding laser light transmitted through the filter 45 while adding astigmatism thereto, whereby the light irradiates a quadrant photodiode (photodetector device) 42 made by equally dividing a photodiode into four and forms a converged image on a light-receiving surface of the quadrant photodiode 42. The quadrant photodiode 42 receives the converged image of the reflected light L3 of rangefinding laser light in a split fashion, and outputs voltage values (output values) V corresponding to its individual light quantities.

Since astigmatism is added to the reflected light L3, the converged image changes among longitudinally elongated, perfectly circular, and laterally elongated forms depending on at which position the front face 3 of the wafer 1 is located with respect to the converging point P2 of the rangefinding laser light L2. The principle of this change will now be explained.

Figure 16:
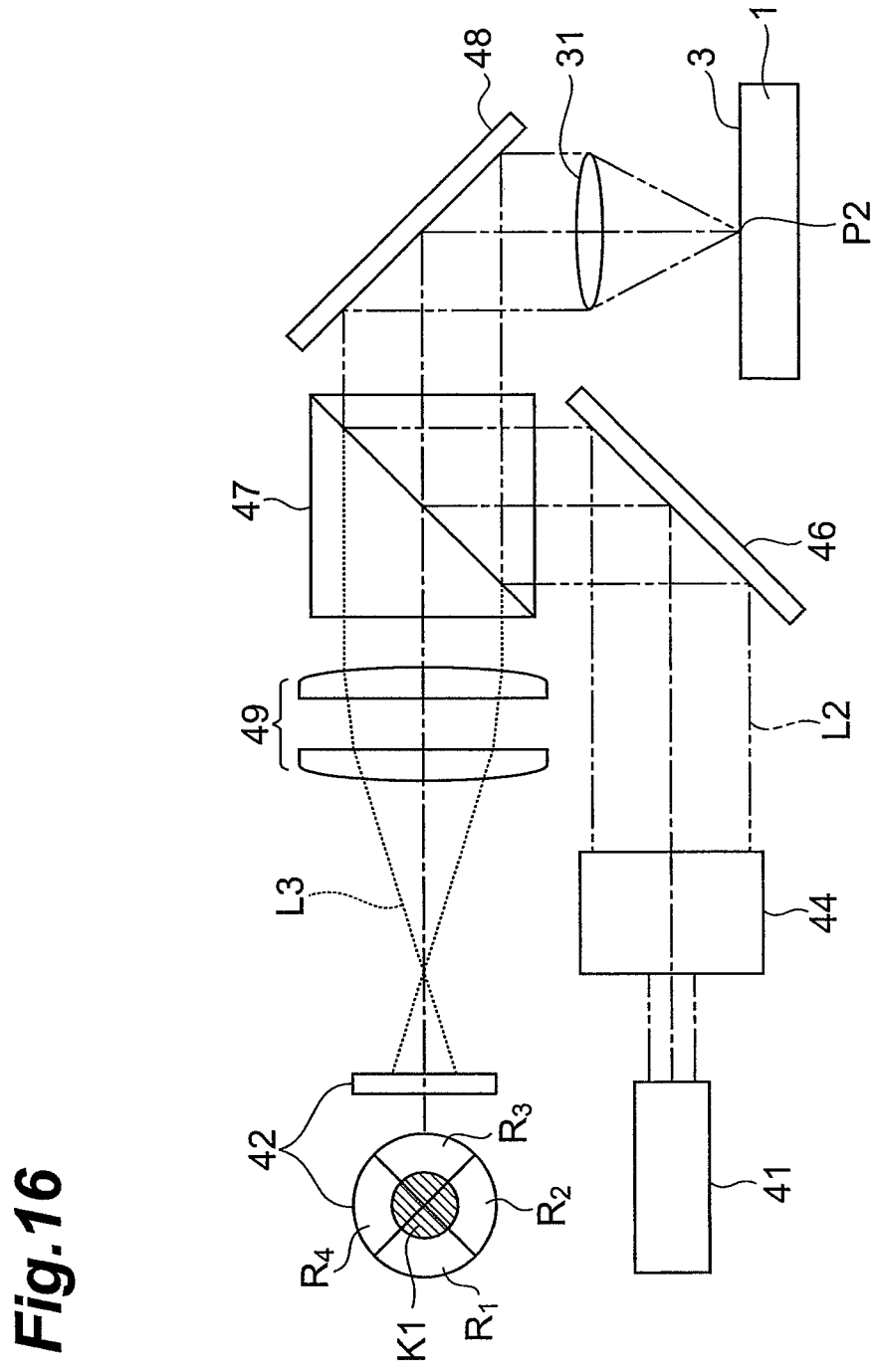
FIG. 16 is a view for explaining the converged image of reflected light of rangefinding laser light in the case where the object and the converging point of the rangefinding laser light are located at the same position.

When the front face 3 of the wafer 1 and the converging point P2 of rangefinding laser light L2 are located at the same position as shown in FIG. 16, the reflected light L3 of rangefinding laser light passes the converging lens 31 of the processing objective lens 27 backward through the same path as that of the rangefinding laser light L2, and thus forms a perfectly circular converged image K1 on the quadrant photodiode 42.

Figure 17:
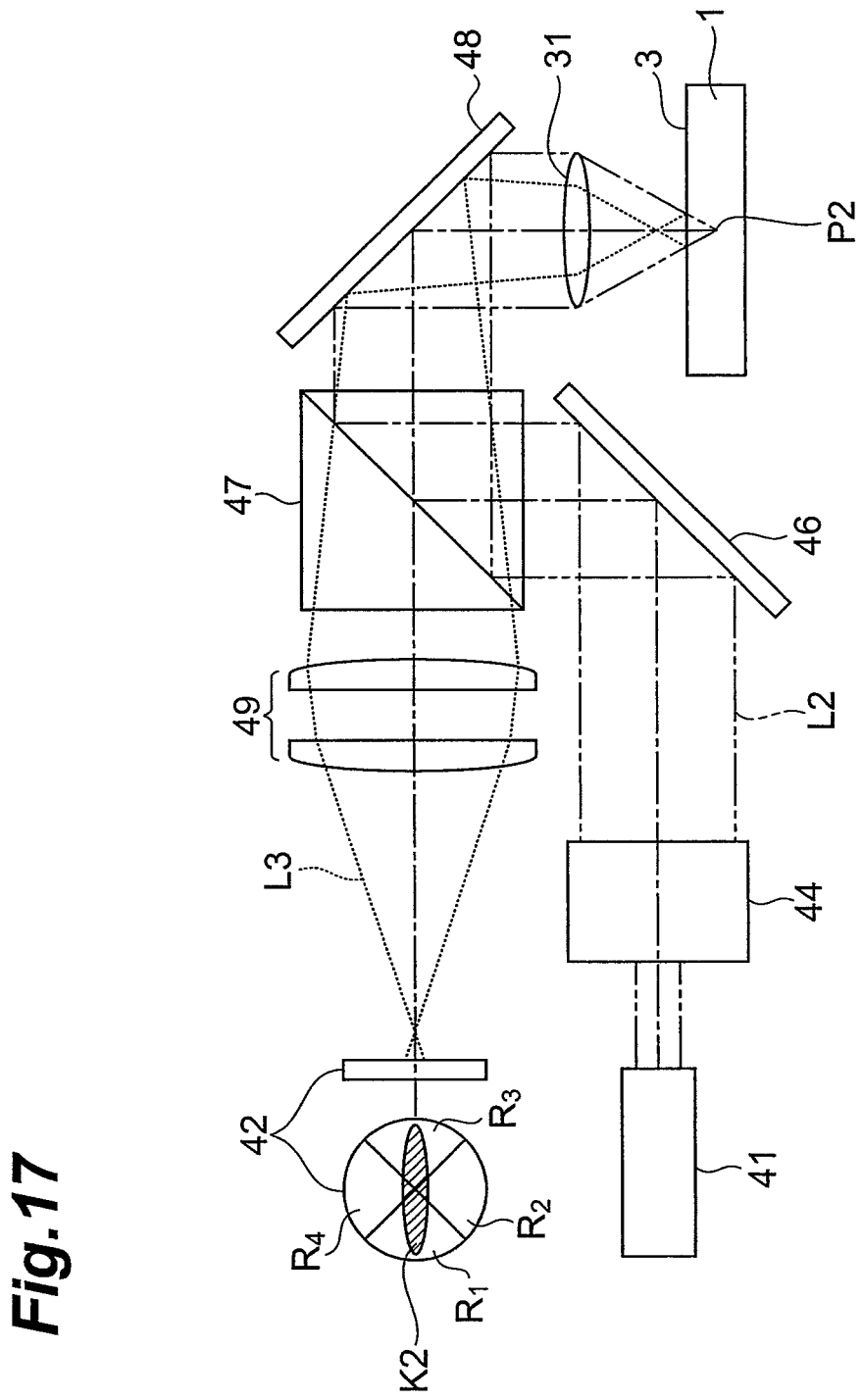
FIG. 17 is a view for explaining the converged image of reflected light of rangefinding laser light in the case where the object is placed at a position closer to the converging lens than is the converging point of the rangefinding laser light.

When the front face 3 of the wafer 1 is located at a position closer to the converging lens 31 than is the converging point P2 of the rangefinding laser light L2 as shown in FIG. 17, the reflected light L3 of rangefinding laser light passes the converging lens 31 of the processing objective lens 27 backward while diffusing unlike the rangefinding laser light L2, and thus forms a laterally elongated elliptical converged image K2 on the quadrant photodiode 42.

Figure 18:
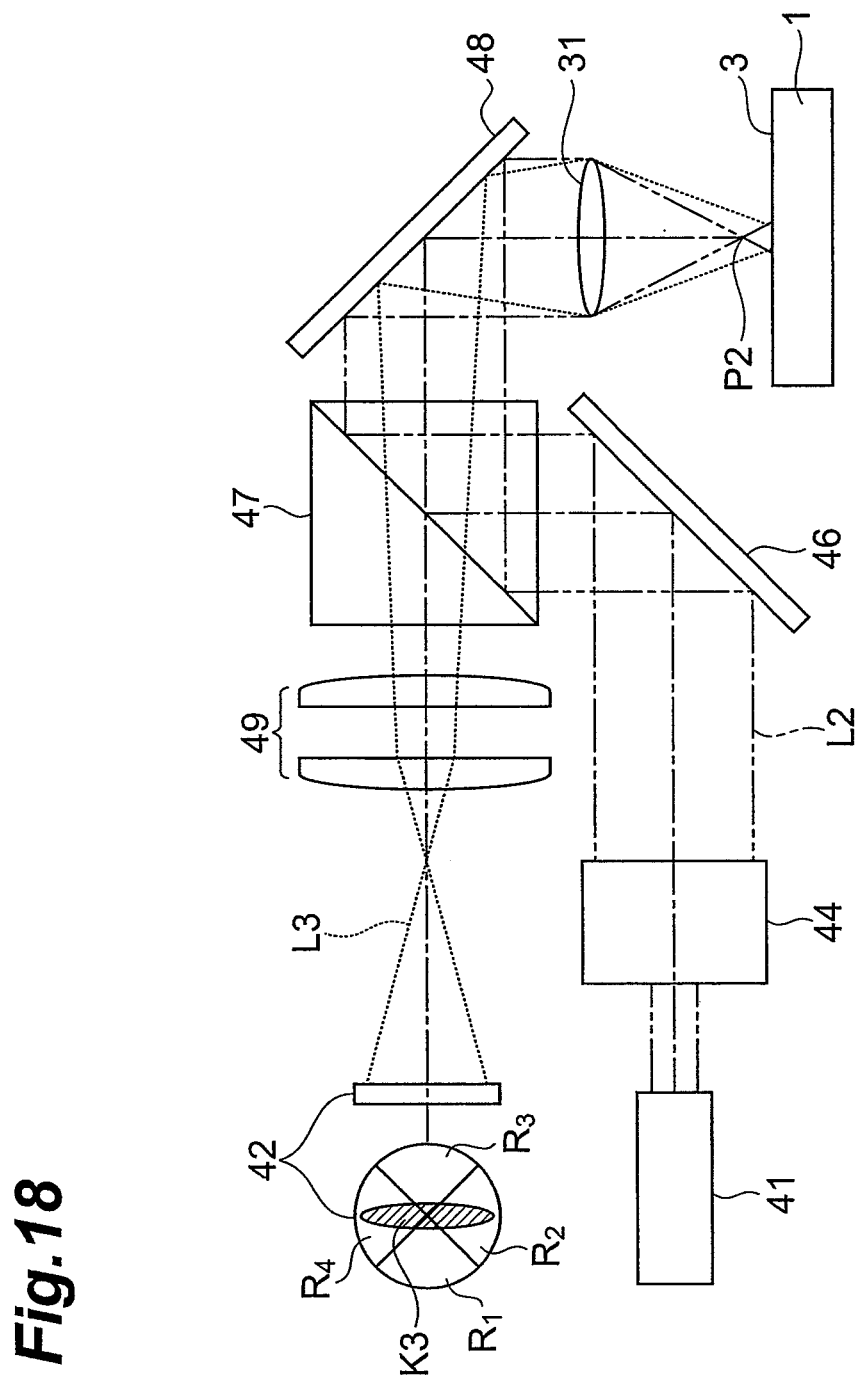
FIG. 18 is a view for explaining the converged image of reflected light of rangefinding laser light in the case where the object is placed at a position farther from the converging lens than is the converging point of the rangefinding laser light.

When the front face 3 of the wafer 1 is located at a position farther from the converging lens 31 than is the converging point P2 of the rangefinding laser light L2 as shown in FIG. 18, the reflected light L3 of rangefinding laser light passes the converging lens 31 of the processing objective lens 27 backward while converging unlike the rangefinding laser light L2, and thus forms a longitudinally elongated elliptical converged image K3 on the quadrant photodiode 42.

As in the foregoing, the converged image of the reflected light L3 of rangefinding laser light on the quadrant photodiode 42 changes depending on the position of the front face 3 of the wafer 1 with respect to the converging point P2 of the rangefinding laser light L2. Therefore, the voltage value V outputted from the quadrant photodetector 42 varies depending on the position of the front face 3 of the wafer 1 with respect to the converging point P2 of the rangefinding laser light L2.

Therefore, as shown in FIG. 15, the laser processing apparatus 20 has a controller (control means) 40, and uses the controller 40 to calculate an arithmetic value N as positional information concerning the position of the front face 3 of the wafer 1 with respect to the converging point P2 of the rangefinding laser light L2. Then, the controller 40 regulates the actuator 28 and finely adjusts the position of the processing objective lens 27 in the vertical direction such that the position of the converging point P1 of the processing laser light L1 is located at a fixed depth from the front face 3.

Specifically, the following arithmetic operation is performed in the controller 40. Namely, voltage values V1, V3 outputted according to respective light quantities in light-receiving surfaces R1, R3 longitudinally opposing each other and voltage values V2, V4 outputted according to respective light quantities in light-receiving surfaces R2, R4 laterally opposing each other are operated according to the following expression (1), whereby the arithmetic value N is determined. This arithmetic value N is divided by the sum of the voltage values V1, V2, V3, V4 corresponding to all the light quantities received by the quadrant photodiode 42, so as to become a relative value to the total light quantity received.

$$N=[(V1+V3)-(V2+V4)]/(V1+V2+V3+V4) \qquad (1)$$

where

V1 is the voltage value outputted according to the light quantity in the light-receiving surface R1;

V2 is the voltage value outputted according to the light quantity in the light-receiving surface R2;

V3 is the voltage value outputted according to the light quantity in the light-receiving surface R3; and V4 is the voltage value outputted according to the light quantity in the light-receiving surface R4.

FIG. 19 is a chart showing the arithmetic value N with respect to the distance from the front face 3 of the wafer 1 to a focal point (hereinafter referred to as "focal point of the converging lens") P0 which is the converging point of viewing visible light L0 due to the converging lens 31. In this chart, the abscissa indicates the distance from the front face 3 of the wafer 1 to the focal point P0 of the converging lens 31, whereas the ordinate indicates the magnitude of arithmetic value N. Here, the front face 3 of the wafer 1 is positioned closer to the converging lens 31 as the value is greater on the left side with reference to the origin. The front face 3 of the wafer 1 is positioned farther from the converging lens 31 as the value is greater on the right side with reference to the origin.

In a typical laser processing apparatus, as shown in FIG. 19(a), the relationship between the distance from the front face 3 of the wafer 1 to the focal point P0 of the converging lens 31 becomes a substantially S-shaped curve F which is symmetrical about the converging point P2 of the rangefinding laser light L2. In the vicinity of the upper and lower inflection points F1 and F2 in this curve F, the reflected light L3 of received rangefinding laser light protrudes from the light-receiving surface of the quadrant photodiode 42, thereby yielding the same arithmetic values with opposite polarities. Therefore, as shown in FIGS. 19(a) and 20(a), an acquirable area W which is an area where accurate positional information is acquirable lies between the inflection points F1 and F2, e.g., from −20 μm to +20 μm when the focal point P0 of the converging lens 31 is at a reference value of 0 μm.

Figure 21:
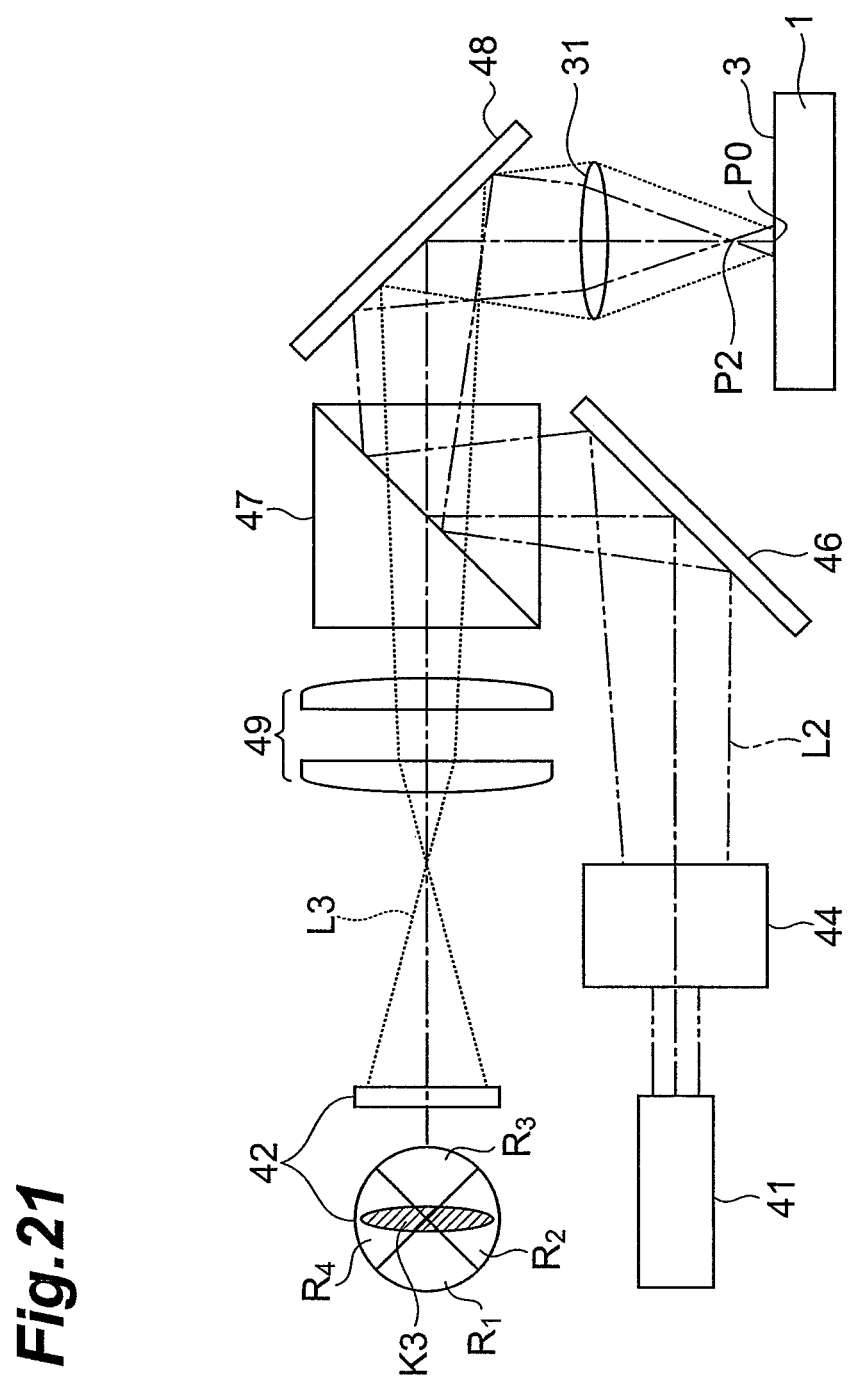
FIG. 21 is a view for explaining the converging point of the rangefinding laser light in the laser processing apparatus shown in FIG. 14.

Here, the laser processing apparatus 20 moves the positions of the pinhole 43 and beam expander 44 along the optical axis of the rangefinding laser light L2 and so forth, for example, thereby making the rangefinding laser light L2 incident on the converging lens 31 while converging the laser light L2 in a state where the focal point of the converging lens 31 is located on the front face 3 of the wafer 1 as shown in FIG. 21. Therefore, as shown in FIGS. 19(b) and 20(b), the acquirable area W is moved closer to the converging lens than is the focal point P0 of the converging lens 31, and extends from −15 μm to +25 μm when the focal point P0 of the converging lens 31 is at 0 μm, for example.

A laser processing method by the above-mentioned laser processing apparatus 20 will now be explained. This laser processing method is a method (hereinafter referred to as "realtime processing") of emitting the rangefinding laser light L2 simultaneously with the processing laser light L1, so as to form a modified region 7 at a fixed distance from the front face 3 of the wafer 1, and making the modified region 7 form a starting point for cutting 8 extending along a line to cut 5.

First, the wafer 1 is mounted on the stage 30, and the stage 30 and housing 23 are moved in X and Y directions such that the wafer 1 is placed at a laser processing start position. Next, in a state where the actuator 28 holding the processing objective lens 27 is expanded from its most compressed state by one half of the maximum expansion amount, e.g., by 25 μm when the maximum expansion amount is 50 μm, the housing 23 is moved up and down by the housing driving part 25 while the focusing of a reticle image projected on the front face 3 of the wafer 1 is seen with the TV monitor 64, such that the focal point P0 of the converging lens 31 is positioned on the front face 3 of the wafer 1.

Subsequently, the housing 23 is moved in Z direction such that the converging point P1 of the processing laser light L1 is positioned at a desirable distance from the front face of the wafer 1. Then, the laser light source 41 emits the rangefinding laser light L2 at the same time when the laser light source 22 emits the processing laser light L1, and the stage 30 and housing 23 are moved in X and Y directions such that the laser light beams L1, L2 converged by the converging lens 31 are scanned on the line to cut 5. Here, the reflected light L3 of rangefinding laser light is detected, and the controller 40 feedback-controls the actuator 28 such that the converging point P1 of processing laser light L1 is always positioned at a fixed distance from the front face 3 of the wafer 1. This feedback control is made such that the arithmetic value due to the detected reflected light L3 keeps N0 corresponding to a fixed distance T0 as shown in FIG. 19(b), whereby a voltage value by which N0 is maintained is applied to the actuator 28, and the position of the processing objective lens 27 is finely adjusted in the vertical direction. Then, the modified region 7 is formed along the front face 3 of the wafer 1 at a fixed distance from the front face 3.

Thus, the rangefinding laser light L2 is emitted simultaneously with the processing laser light L1, so as to form the modified region 7, whereby the modified region 7 can be formed efficiently in the realtime processing. The realtime processing becomes particularly effective when the wafer 1 is thin, because its front face wobbles greatly in this case.

In the laser processing apparatus 20, as explained in the foregoing, the converging point P2 of the rangefinding laser light L2 converged toward the wafer 1 by the converging lens 31 is positioned between the focal point P0 of the converging lens 31 and the converging lens 31, so that the acquirable area W of positional information concerning the position of the front face 3 of the wafer 1 is shifted toward the converging lens 31 in the optical axis direction of the converging lens 31 with reference to the focal point P0 of the converging lens 31. Consequently, the processing laser light L1 and rangefinding laser light L2 are emitted in a state where the focal point P0 of the converging lens 31 is located within the wafer 1, i.e., in a state where the front face 3 of the wafer 1 is positioned closer to the converging lens 31 than is the focal point P0 of the converging lens 31, whereby the acquirable area W of positional information can substantially be expanded. Therefore, the positional information of the front face 3 of the wafer 1 can be acquired accurately even when forming the modified region 7 at a position deeper from the front face 3 of the wafer 1, so that the modified region 7 can precisely be formed at a desirable position within the wafer 1.

The arithmetic value N has been subjected to a division by the sum of voltage values V outputted by the quadrant photodiode 42, and thus becomes a relative value to the total light quantity received. Consequently, even when the light quantity of the rangefinding laser light L2 reflected by the front face 3 of the wafer 1 changes under the influence of the film thickness formed on the front face 3 of the wafer 1, for example, so that the voltage value V outputted from the quadrant photodiode 42 varies, the arithmetic value N can be prevented from fluctuating, whereby the modified region 7 can accurately be formed at a desirable position within the wafer 1.

A laser processing method (hereinafter referred to as "trace processing") in which the rangefinding laser light L2 is emitted before emitting the processing laser light L1 will now be explained as being focused on differences from the realtime processing.

In the trace processing, the rangefinding laser light L2 is emitted before emitting the processing laser light L1, and the stage 30 and housing 23 are moved in X and Y directions such that the rangefinding laser light L2 converged by the converging lens 31 is scanned on the line to cut 5. Here, the reflected light L3 of rangefinding laser light is detected, and the controller 40 feedback-controls the actuator 28 such that the converging point P2 of the rangefinding laser light L2 is always positioned at a fixed distance from the front face 3 of the wafer 1. The voltage value of the voltage applied to the actuator 28 for performing the feedback control is memorized in the controller 40.

Subsequently, the housing 23 is moved in Z direction such that the converging point P1 of the processing laser light L1 is positioned at a desirable distance from the front face of the wafer 1. Then, while emitting the processing laser light L1 from the laser light source 22, the stage 30 is moved again in X and Y directions such that the processing laser light L1 is scanned on the line to cut 5. Here, the controller 40 applies a voltage to the actuator 28 according to the memorized voltage value, whereby the position of the processing objective lens 27 is finely adjusted in the vertical direction.

Since the rangefinding laser light L2 is thus emitted before emitting the processing laser light L1, the modified region 7 can reliably be formed in the trace processing even when the wafer 1 is so thick that the distance from the starting point for cutting 8 to the front face 3 of the wafer 1 is too long to be processed by the realtime processing.

When the trance processing is performed, the surface of the wafer 1 on which laser light is incident is likely to be a background surface where cutting marks 71 exist. In the typical trace processing, however, the actuator 28 is feedback-controlled such that the converging point P2 of the rangefinding laser light L2 is always positioned on the focal point P0 of the converging lens 31, i.e., on the front face 3 of the wafer 1, when the rangefinding laser light L2 is scanned on the line to cut 5, whereby the area of the converged image Q1 of the rangefinding laser light L2 at the focal point P0 of the converging lens 31 is in a narrowed state as shown in FIG. 22(a), which increases the ratio of cutting marks 71 in the converged image Q1. This causes a fear of enhancing adverse effects such as scattering of the reflected light L3 of rangefinding laser light by the cutting marks 71.

Therefore, in the trace processing by the laser processing apparatus 20, the converging point P2 of the rangefinding laser light L2 converged toward the wafer 1 by the converging lens 31 is positioned between the focal point P0 of the converging lens 31 and the converging lens 31, whereby the converged image Q2 of the rangefinding laser light L2 at the position of the focal point P0 of the converging lens 31, i.e., on the front face 3 of the wafer 1, has a larger area as shown in FIG. 22(b). Consequently, even when the front face 3 of the wafer 1 is a background surface with many cutting marks 71, the ratio of cutting marks 71 in the converged image Q2 is so small that adverse effects such as scattering of the reflected light of rangefinding laser light by the cutting marks 71 on the front face 3 of the wafer 1 can be suppressed. Hence, positional information of the front face 3 of the wafer 1 can accurately be acquired, whereby the modified region 7 can precisely be formed at a desirable position within the wafer 1.

The present invention is not limited to the embodiment mentioned above. For example, while the converging point P1 of the processing laser light L1 is located at a position separated by a fixed distance from the front face 3 of the wafer 1 in the above-mentioned embodiment, the position of the converging point P1 may be controlled such that the position where the converging point is located changes along the line to cut 5. For example, the position where the converging point P1 of the processing laser light L1 is located may be changed like a wavy line, or the depth at which the converging point P1 of the processing laser light L1 is located may be changed in the middle.

Though the quadrant photodiode 42 is used for the light-receiving device as being particularly preferred in the above-mentioned embodiment, photodiodes divided into two or eight, for example, may also be used. In these cases, the arithmetic operation for determining the arithmetic value in the controller corresponds to the number of voltage values outputted in response to the light received.

Though the shaping optical system 49 acting as the astigmatism adding means is constructed by using a cylindrical lens in the above-mentioned embodiment, it may also be constructed by using aspheric lenses such as toric lens, for example, as long as predetermined astigmatism is added to the reflected light of rangefinding laser light.

INDUSTRIAL APPLICABILITY

The present invention can accurately form a modified region to become a cutting start point at a desirable position within an object to be processed.

The invention claimed is:

1. A laser processing apparatus for forming a modified region to become a cutting start point within a planar object to be processed by irradiating the object with first laser light while locating a converging point within the object;

the apparatus comprising:

a converging lens for converging the first laser light and second laser light to be reflected by a laser-light-irradiated surface irradiated with the first laser light in the object toward the object;

driving means for actuating the converging lens along an optical axis direction thereof;

astigmatism adding means for adding astigmatism to reflected light of the second laser light reflected by the laser-light-irradiated surface;

a photodetector device for receiving the astigmatism-added reflected light of the second laser light reflected by the laser-light-irradiated surface in a split fashion and outputting respective output values corresponding to light quantities of reflected light components of the second laser light received in the split fashion; and control means for regulating the driving means such that the converging point of the first laser light is positioned at a predetermined distance from the laser-light-irradiated surface;

wherein the second laser light is converged toward the object by the converging lens such as to have a converging point between a focal point of the converging lens and the converging lens; and wherein the control means regulates the driving means according to an arithmetic value acquired by subjecting the output values outputted from the photodetector device to a division by a sum of the output values and a predetermined arithmetic operation.

2. A laser processing apparatus according to claim 1, wherein the control means regulates the driving means such that the arithmetic value becomes constant.

3. A laser processing apparatus for forming a modified region to become a cutting start point within a planar object to be processed along a line to cut the object by irradiating the object with first laser light while locating a converging point within the object with a converging lens;

along with moving the converging lens along the line to cut relative to the object while causing the converging lens to converge the first laser light within the object, the apparatus causing the converging lens to converge second laser light to be reflected by a laser-light-irradiated surface irradiated with the first laser light in the object toward the object such that a converging point of the second laser light is positioned between a focal point of the converging lens and the converging lens;

adding astigmatism to reflected light of the second laser light reflected by the laser-light-irradiated surface;

receiving the astigmatism-added reflected light of the second laser light reflected by the laser-light-irradiated surface in a split fashion and outputting respective output values corresponding to light quantities of reflected light components of the second laser light received in the split fashion; and actuating the converging lens along an optical axis direction thereof such that the converging point of the first laser light is positioned at a predetermined distance from the laser-light-irradiated surface according to an arithmetic value acquired by subjecting the outputted values to a division by a sum of the output values and a predetermined arithmetic operation.

4. A laser processing apparatus for forming a modified region to become a cutting start point within a planar object to be processed along a line to cut the object by irradiating the object with first laser light while locating a converging point within the object with a converging lens;

along with moving the converging lens along the line to cut relative to the object while causing the converging lens to converge second laser light to be reflected by a laser-light-irradiated surface irradiated with the first laser light in the object such that a converging point of the second laser light is positioned between a focal point of the converging lens and the converging lens, the apparatus adding astigmatism to reflected light of the second laser light reflected by the laser-light-irradiated surface;

receiving the astigmatism-added reflected light of the second laser light reflected by the laser-light-irradiated surface in a split fashion and outputting respective output values corresponding to light quantities of reflected light components of the second laser light received in the split fashion;

actuating the converging lens along an optical axis direction thereof such that the converging point of the first laser light is positioned at a predetermined distance from the laser-light-irradiated surface according to an arithmetic value acquired by subjecting the outputted values to a division by a sum of the output values and a predetermined arithmetic operation, and acquiring actuation information concerning the actuation of the converging lens; and then, along with moving the converging lens along the line to cut relative to the object while converging the first laser light within the object with the converging lens, actuating the converging lens according to the actuation information acquired therebefore.

* * * * *

UNITED STATES PATENT AND TRADEMARK OFFICE
CERTIFICATE OF CORRECTION

PATENT NO. : 8,563,893 B2  Page 1 of 1
APPLICATION NO. : 12/096940
DATED : October 22, 2013
INVENTOR(S) : Kuno et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1175 days.

Signed and Sealed this

Fifteenth Day of September, 2015

Michelle K. Lee
*Director of the United States Patent and Trademark Office*